(12) United States Patent
Haraguchi et al.

(10) Patent No.: US 7,727,612 B2
(45) Date of Patent: Jun. 1, 2010

(54) AUTOMOTIVE FLOOR MAT AND AUTOMOTIVE FLOOR MAT FASTENER

(75) Inventors: Hirotaka Haraguchi, Saitama (JP); Hinako Tamagawa, Saitama (JP); Toshihide Matsuoka, Saitama (JP); Masashi Takahashi, Saitama (JP)

(73) Assignee: Honda Access Corp., Saitama (JP)

( * ) Notice: Subject to any disclaimer, the term of this patent is extended or adjusted under 35 U.S.C. 154(b) by 589 days.

(21) Appl. No.: 10/363,700

(22) PCT Filed: Sep. 3, 2001

(86) PCT No.: PCT/JP01/07593

§ 371 (c)(1),
(2), (4) Date: Aug. 4, 2003

(87) PCT Pub. No.: WO02/22393

PCT Pub. Date: Mar. 21, 2002

(65) Prior Publication Data

US 2004/0080176 A1    Apr. 29, 2004

(30) Foreign Application Priority Data

Sep. 12, 2000  (JP) .................... 2000-277233
Oct. 25, 2000  (JP) .................... 2000-325899
Jun. 19, 2001  (JP) .................... 2001-184641

(51) Int. Cl.
    *B32B 3/06* (2006.01)
(52) U.S. Cl. .............. 428/99; 428/98; 15/215; 52/177; 296/97.23
(58) Field of Classification Search ............ 428/99, 428/98, 85; 15/215; 52/177; 296/97.23
    See application file for complete search history.

(56) References Cited

U.S. PATENT DOCUMENTS 4,588,628 A * 5/1986 Roth ................... 428/85
4,829,627 A * 5/1989 Altus et al. ................. 16/4
4,921,742 A * 5/1990 Altus ..................... 428/81
6,155,629 A * 12/2000 Sherman ............... 296/97.23

FOREIGN PATENT DOCUMENTS

| JP | 50-84939 | 7/1975 |
| JP | 56-102244 | 8/1981 |
| JP | 58-112835 | 7/1983 |
| JP | 60-131438 | 9/1985 |
| JP | 2-299938 A | 12/1990 |

(Continued)

OTHER PUBLICATIONS

Japanese Unexamined Laid-open Utility Model Publication No. S50-84939.*
Notice of Reason of Rejection mailed from the Japan Patent Office on Mar. 11, 2004 for corresponding Japanese Patent Appln. No. 2000-325899.

(Continued)

*Primary Examiner*—Stanley Silverman
*Assistant Examiner*—Paul Wartalowicz
(74) *Attorney, Agent, or Firm*—Westerman, Hattori, Daniels & Adrian, LLP

(57) ABSTRACT

An automotive vehicle floor mat M to be laid on a foot space of a driver's seat, characterized in that retainer holes to be retained at retainer pins implanted on a vehicle floor side, are provided at two positions at a predetermined interval near a rear edge portion of the mat, a first retainer hole of the two position retainer holes is provided on a right rear side of the mat and in the vicinity of a rear extension portion of an accelerator pedal, a second retainer hole is provided on a rear extension portion of a brake pedal and rather on a center side of the mat than the first retainer hole, a retainer member having a rigidity is provided on an inner edge of each retainer hole, and a thickness of the retainer member is smaller than a height of the retainer pins.

28 Claims, 32 Drawing Sheets

FOREIGN PATENT DOCUMENTS

| | | |
|---|---|---|
| JP | 4-37033 | 3/1992 |
| JP | 4-46937 | 4/1992 |
| JP | 50-84939 | 4/1993 |
| JP | 6-65081 | 9/1994 |
| JP | 8-225036 A | 9/1996 |
| JP | 9-112513 | 5/1997 |
| JP | 2000-095003 | 4/2000 |
| JP | 2000-95007 | 4/2000 |
| JP | 2000-095007 | 4/2000 |
| JP | 2000-227107 | 8/2000 |
| WO | WO91/16218 * | 10/1991 |

OTHER PUBLICATIONS

Notice of Reason of Rejection mailed from the Japan Patent Office on Oct. 4, 2004 for corresponding Japanese Patent Appln. No. 2001-184641.

Supplementary Search report mailed Nov. 28, 2008, issued in corresponding European Application No. 01961305.8.

* cited by examiner

AUTOMOTIVE FLOOR MAT AND AUTOMOTIVE FLOOR MAT FASTENER

TECHNICAL FIELD

The present invention relates to a carpet-like or resin-coated surface-like floor mat laid on a surface (floor of a vehicle) in a foot space of the seat of the automotive vehicle and more particularly to a fastener provided with retainer pins for holding the mat by utilizing holder holes (so called snap engagement provided with retainer members) formed in the floor mat.

BACKGROUND ART

A fastener member in which a retainer pin is implanted is screwed and fixed by utilizing, for example, a cross member on the vehicle side. The mat is laid in the foot space of the vehicle so that a retainer hole provided in a floor mat is fitted and retained at this retainer pin that is implanted and fixed to the top surface of the vehicle floor. In general, since the number of the retainer pins is one, it is difficult to positively position the mat in the rotational direction upon laying the mat.

Although the retainer pin is inserted into the retainer hole of the mat so that the flooring position is determined in the back-and-forth direction, the posture in the right and left direction of the mat could not correctly be determined upon laying the mat only with one retainer pin.

On the other hand, it is possible to provide the retainer holes at two positions over the full width of the mat and provide and implant the retainer pins at the corresponding suitable positions in order to perform the positioning upon laying the mat as preset. However, since the hole position is changed due to cleaning of the mat, aging change and machining errors, it is necessary to take a structure that the interval between the retainer pins may be adjusted. As a result, it is impossible to expect the exact mat mounting. After all, it has been desirable to use only one retainer pin.

Also, in the case of the two retainer pins, since the right foot of the driver that steps the accelerator pedal is almost in contact with the accelerator pedal on the front side of the floor, if the retainer pin is located on the rear side, there is no fear that the shoe of the driver comes into contact with the retainer pin to be damaged. However, since the left foot is not always hooked on the brake pedal or the clutch pedal, even if the retainer pin is located on the rear side of the mat, the shoe of the left foot comes into contact with the left side retainer pin so that the shoe might be damaged.

In view of the above-noted current situation, an object of the present invention is to provide a quite novel automotive vehicle floor mat and an automotive vehicle floor mat retainer unit, in which retainer pins and retainer holes are provided at two positions to make it possible to positively perform the positioning upon laying the mat, and in addition, the positions and the arrangement interval of these retainer pins and the retainer holes are suitably selected to thereby dispense with using a structure for adjusting the interval between the retainer pins, also to cope with change of the hole positions due to the aging change, to make it possible to use the mat for a long period of time without a fear that the retainer pins could not be fitted into the retainer holes, to narrow the interval not too much to thereby make it possible to perform the positive positioning upon laying the mat, i.e., to make it possible to lay and set the mat even if the mat is used for a long period of time due to the rattling displacement of the retainer pins and the retainer holes, to make it possible to cause the positional displacement upon laying and setting the mat to fall within a range where no substantially problem is raised in both in the back-and-forth direction and the right and left rotational direction, and furthermore to keep not only the right foot but also the left foot of the driver to hardly come into contact with the retainer pins to thereby bring about almost no fear that the shoe is damaged.

Also, in the case where the two retainer pins are provided, it is necessary to arrange the two retainer pins at a suitable interval in the above-described positions. However, on the other hand, because the mounting positions, on the vehicle side, of the retainer unit in which the retainer pins are implanted are limited, the present invention improves a shape and a structure of the vehicle floor mat retainer member. An object of the present invention is also to provide an automotive vehicle floor mat and an automotive vehicle floor mat retainer unit, in which the mat may be positively positioned by the two position retainers and the two retainer pins may be arranged in the positions where there is no problem described above, even if the mounting position is limited.

Also, in some cases, a projecting portion is provided below the accelerator pedal, the floor mat is laid, and at the same time, a right corner front edge portion of the floor mat is brought into contact or abutment with a stepped portion between a rear end portion of this projecting portion and the floor surface so that the mat may correctly and easily be positioned in place. In order to further enhance the positioning effect of the mat, an object of the invention is also to provide an automotive vehicle floor mat, in which an improvement is effected to the portion corresponding to this projecting portion.

Also, in the case of a mat having a cutaway in the vehicle central rear portion, for example, mat having a cutaway shape from a side end of the vehicle central side of the mat rear portion to the mat central portion for avoiding a projection of the floor of the vehicle central lower portion of a driver's seat so that the mat to be laid only on a flat floor surface of the vehicle, the retainer pin of the right side of the vehicle (the left side of the right steering wheel vehicle) is located rather on the front side due to the mat shape so that the possibility of damage of the right shoe is increased.

In view of the above-noted current situation, an object of the present invention is to provide a quite novel automotive vehicle floor mat and an automotive vehicle floor mat retainer unit, in which retainer pins and retainer holes are provided at two positions to make it possible to positively perform the positioning upon laying the mat, and in addition, the positions and the arrangement interval of these retainer pins and the retainer holes are suitably selected to thereby dispense with using a structure for moving the retainer pins to some extent, also to cope with change of the hole positions due to the aging change, also to cope with change of the hole positions due to the aging change, to make it possible to use the mat for a long period of time without a fear that the retainer pins could not be fitted into the retainer holes, to narrow the interval not too much to thereby make it possible to perform the positive positioning upon laying the mat, i.e., to make it possible to lay and set the mat even if the mat is used for a long period of time due to the rattling displacement of the retainer pins and the retainer holes, to make it possible to cause the positional displacement upon laying and setting the mat to fall within a range where no substantially problem is raised in both in the back-and-forth direction and the right and left rotational direction, and furthermore to keep not only the right foot but also the left foot of the driver to hardly come into contact with the retainer pins to thereby bring about almost no fear that the shoe is damaged.

DISCLOSURE OF THE INVENTION

A first aspect of the invention relates to an automotive vehicle floor mat M to be laid on a foot space of a driver's seat, characterized in that retainer holes 2 to be retained at retainer pins 1 implanted on a vehicle floor side, respectively, are provided at two positions at a predetermined interval in the vicinity of a rear edge portion of the mat M, a first retainer hole 2A of the two position retainer holes 2 is provided on a right rear side of the mat M and in the vicinity of a rear extension portion of an accelerator pedal 3, a second retainer hole 2B is provided in the vicinity of a rear extension portion of a brake pedal 4 and rather on a center side of the mat M than the first retainer hole 2A, a retainer member 5 having a rigidity and made of metal or non-metal is provided on an inner edge of each retainer hole 2, and a thickness of the retainer member 5 is set to be smaller than a height of the retainer pins 1.

Also, according to a second aspect of the invention, the automotive vehicle floor mat according to the first aspect of the invention is further characterized in that a center interval between the two position retainer holes 2 is in the range of 100 mm to 250 mm.

Also, according to a third aspect of the invention, the automotive vehicle floor mat according to either first or second aspects is further characterized in that a center of the first retainer hole 2A is position on the right side of a left edge extension line of the accelerator pedal 3 or a right edge extension line of the accelerator pedal, and a center of the second retainer hole 2B is on the right side of a left extension line of the brake pedal 4 or a center extension line of the brake pedal 4.

Also, according to a fourth aspect of the invention, an automotive vehicle floor mat retainer unit T for retaining the automotive vehicle floor mat M according to any one of the first to third aspects is characterized in that the retainer pins are implanted at positions where the retainer pins 1 are inserted into the two position retainer holes 2 provided at the predetermined positions of the automotive vehicle floor mat M, in a substrate portion 6 for fixture to a vehicle body.

Also, according to a fifth aspect of the invention, an automotive vehicle floor mat retainer unit is characterized in that retainer pins 1 are implanted in positions where the retainer pins are inserted into two position retainer holes 2 provided at predetermined positions of an automotive vehicle floor mat M, in a substrate portion 6 for fixture to a vehicle body, and under the condition of fixture to the vehicle body, a first retainer pin 1A of the two retainer pins 1 is provided in the vicinity of a rear extension portion of an accelerator pedal 3 and on a right rear side of the mat M and a second retainer pin 1B is provided in the vicinity of a rear extension portion of a brake pedal 4 and rather on a center portion of the mat M than the first retainer pin 1A.

Also, according to a sixth aspect of the invention, the automotive vehicle floor mat retainer unit according to either fourth or fifth aspects is further characterized in that the two retainer pins 1 are in a juxtaposed condition in a right and left direction at an interval that is identified with an interval of the two position retainer holes 2, in a single substrate portion 6 covered by a rear edge portion of the automotive vehicle floor mat M and provided with a fixture portion 7 for fixture to the vehicle body.

Also, according to a seventh aspect of the invention, the automotive vehicle floor mat retainer unit according to the sixth aspect of the invention is further characterized by comprising the fixture portion 7 for fixture to the vehicle body, the substrate portion 6 in which the two retainer pins 1 are implanted and a rotation preventing portion 8 retained to the vehicle body for preventing the substrate portion 6 from rotating, and in that a single metal plate is bent and formed to establish an L-shaped relation among the respective portions 6, 7 and 8 with each other.

Also, according to an eighth aspect of the invention, the automotive vehicle floor mat retainer unit according to either fourth or fifth aspect of the invention is characterized by comprising the fixture portion 7 for fixture to the vehicle body and two substrate portions 6 each of which has the single retainer pin 1 implanted, and in that under the condition that each substrate plate portion 6 is fixed to the vehicle body by each fixture portion 7, the two retainer pins 1 are arranged at the positions where the pins are inserted into the retainer holes 2 of the automotive vehicle floor mat M.

Also, according to a ninth aspect of the invention, the automotive vehicle floor mat retainer unit according to any one of the fourth to eighth aspects of the invention is characterized in that a head portion of the retainer pin 1 is expanded and formed to have at least a greater width in a back-and-forth direction than a shaft portion and slanted and raised upwardly on the rear side.

Also, according to a tenth aspect of the invention, the automotive vehicle floor mat retainer unit according to any one of the fourth to ninth aspects of the invention is characterized in that a cap 9 made of hard rubber is fitted at a tip end of the retainer pin 1 to form a head portion of the retainer pin 1.

Also, according to an eleventh aspect of the invention, the automotive vehicle floor mat retainer unit according to any one of the fourth to tenth aspects of the invention is characterized in that the retainer pin 1 is cut, raised and formed from the substrate portion 6.

Also, according to a twelfth aspect of the invention, an automotive vehicle floor mat retainer unit is characterized in that retainer pins 1 that are to be inserted into retainer holes 2 formed in an automotive vehicle floor mat M provided with a fixture portion 7 for fixture to a vehicle body are implanted at two positions in a single substrate portion 6 covered by a rear edge portion of the automotive vehicle floor mat M and each retainer pin 1 is cut and raised in any direction of right and left directions from the substrate portion 6.

Also, according to a thirteenth aspect of the invention, the automotive vehicle floor mat retainer unit according to the twelfth aspect is characterized in that the retainer pin 1 cut and raised in either direction of the right and left directions from the substrate portion 6 is formed into a retainer pin 1 having different widths in a back-and-forth direction and a right and left direction.

Also, according to a fourteenth aspect of the invention, the automotive vehicle floor mat retainer unit according to either twelfth or thirteenth aspect of the invention is further characterized by comprising the fixture portion 7 for fixture to the vehicle body, the substrate portion 6 in which the two retainer pins 1 are implanted and a rotation preventing portion 8 retained to the vehicle body for preventing the substrate portion 6 from rotating, and in that a single metal plate is bent and formed to establish an L-shaped relation among the respective portions 6, 7 and 8 with each other.

Also, according to a fifteenth aspect of the invention, an automotive vehicle floor mat M to be laid on a foot space of a driver's seat is characterized in that retainer holes 2 to be retained at retainer pins 1 implanted on a vehicle floor side, respectively, are provided at two positions at a predetermined interval in the vicinity of a rear edge portion of the mat M, a first retainer hole 2A of the two position retainer holes 2 is provided on a right rear side of the mat M and in the vicinity of a rear extension portion of a floor projecting portion 10 below an accelerator pedal 3, a second retainer hole 2B is provided substantially in the vicinity of a rear extension portion of a brake pedal 4 and rather on a center side of the mat M than the first retainer hole 2A, a retainer member 5 having a rigidity and made of metal or non-metal is provided on an inner edge of each retainer hole 2, a center interval between the first position retainer hole 2A and second position retainer hole 2B is in the range of 100 mm to 200 mm, each of the retainer holes 2A and 2B and the retainer pins 1 for engaging each of the retainer holes 2A and 2B are set at positions hidden by a seat portion of the driver's seat S and a thickness of the retainer member 5 is set to be smaller than a height of the retainer pins 1.

Also, according to a sixteenth aspect of the invention, an automotive vehicle floor mat M to be laid on a foot space of a driver's seat of the right steering wheel vehicle characterized in that retainer holes 2 to be retained at retainer pins 1 implanted on a vehicle floor side, respectively, are provided at two positions at a predetermined interval in the vicinity of a rear edge portion of the mat M, a first retainer hole 2A of the two position retainer holes 2 is provided on a right rear side of the mat M and in a left rear extension line of an accelerator pedal 3 or in a right rear extension line of the accelerator pedal 3, a second retainer hole 2B is provided rather on a center side of the mat M than the first retainer hole 2A and on the right side of a left extension line of a brake pedal 4 or a center extension line of the brake pedal 4, a center interval between the two position retainer holes 2 is in the range of 100 mm to 250 mm, a retainer member 5 having a rigidity and made of metal or non-metal is provided on an inner edge of each retainer hole 2, and a thickness of the retainer member 5 is set to be smaller than a height of the retainer pins 1.

Also, according to a seventeenth aspect of the invention, an automotive vehicle floor mat retainer unit T for retaining the automotive vehicle floor mat M according to either fifteenth or sixteenth aspect of the invention is characterized in that the retainer pins are implanted at positions where the retainer pins 1 are inserted into the two position retainer holes 2 provided at the predetermined positions of the automotive vehicle floor mat M, in a substrate portion 6 for fixture to a vehicle body.

Also, according to an eighteenth aspect of the invention, an automotive vehicle floor mat retainer unit according to seventeenth aspect of the invention is further characterized in that retainer pins 1 are implanted in positions where the retainer pins 1 are inserted into two position retainer holes 2 provided at predetermined positions of an automotive vehicle floor mat M, in a substrate portion 6 for fixture to a vehicle body, and under the condition of fixture to the vehicle body, a first retainer pin 1A of the two retainer pins 1 is provided in the vicinity of a rear extension portion of a floor projecting portion 10 below an accelerator pedal 3 and on a right rear side of the mat M, a second retainer pin 1B is provided in the vicinity of a rear extension portion of a brake pedal 4 and rather on a center portion of the mat M than the first retainer pin 1A and a center interval between the first position retainer pin 1A and second position retainer pin 1B is in the range of 100 mm to 200 mm.

Also, according to a nineteenth aspect of the invention, the automotive vehicle floor mat retainer unit according to either seventeenth or eighteenth aspect of the invention is further characterized by comprising the fixture portion 7 for fixture to the vehicle body and two substrate portions 6 each of which has the single retainer pin 1 implanted, and in that under the condition that each substrate plate portion 6 is fixed to the vehicle body by each fixture portion 7, the two retainer pins 1 are arranged at the positions where the pins are inserted into the retainer holes 2 of the automotive vehicle floor mat M.

Also, according to a twentieth aspect of the invention, the automotive vehicle floor mat retainer unit according to either eighth or nineteenth aspect of the invention is further characterized by comprising the fixture portion 7 for fixture to the vehicle body and two substrate portions 6 each of which has the single retainer pins 1 implanted, one of the substrate portions 6 located on the right side has a length in a back-and-forth direction and is of a straight type in which the fixture portion 7 is provided at a rear end portion thereof, the other substrate portion 6 located on the left side has a long side portion having a length in a right and left direction as an L-shape and is of an L-shaped type in which the fixture portion 7 is provided at a rear end portion of a short side portion in the back-and-forth direction, and each of the substrate portions 6 is disposed so that the two retainer pins 1 are arranged in positions where the retainer pins are inserted into the retainer holes 2 of the automotive vehicle floor mat M under the condition each of the substrate portion 6 is fixed to a vehicle body by each of the fixture portions 7.

Also, according to a twenty-first aspect of the invention, an automotive vehicle floor mat M to be laid in a foot space of a driver's seat is characterized in that a heel step portion 15 at a front right corner with which a heel of right foot stepping an accelerator pedal 3 is brought into contact, of the mat M that is to be laid so as to be close to and in abutment with a stepped portion 13 between a rear end portion of a projecting portion 10 below an accelerator pedal 3 and a floor surface is cured so that the stepped portion 13 is ensured to have a thickness for positioning the mat M under the condition that the mat M is laid.

Also, according to a twenty-second aspect of the invention, an automotive vehicle floor mat M to be laid in a foot space of a driver's seat is characterized in that a pad member 16 is bonded to a heel step portion 15 at a front right corner with which a heel of right foot stepping an accelerator pedal 3 is brought into contact, of the mat M that is to be laid so as to be close to and in abutment with a stepped portion 13 between a rear end portion of a projecting portion 10 below an accelerator pedal 3 and a floor surface so that the stepped portion 13 is ensured to have a thickness for positioning the mat M under the condition that the mat M is laid.

Also, according to a twenty-third aspect of the invention, an automotive vehicle floor mat M to be laid in a foot space of a driver's seat is characterized in that an insertion space portion 14 into which a front edge portion of the mat M is to be inserted is recessed in a rear end portion of a projecting portion 10 below an accelerator pedal 3, and a stepped portion 13 is ensured between a top surface of the mat M and a rear end portion of the projecting portion 10 when the mat is laid under the condition that the front edge portion of the mat M is inserted into the insertion space portion 14.

Also, according to a twenty-fourth aspect of the invention, an automotive vehicle floor mat M to be laid in a foot space of a driver's seat is characterized in that a projecting portion 10 below an accelerator pedal 3 is covered by a front right corner portion of the mat M and the front right corner portion of the mat M is molded and formed into a fitting shape in conformity with the projecting portion 10 so that the mat M may engage with the projecting portion 10.

Also, according to a twenty-fifth aspect of the invention, an automotive vehicle floor mat to be laid in a foot space of a driver's seat is characterized in that retainer holes 2 for retaining, respectively, retainer pins 1 implanted on a vehicle floor side are provided at two positions at a predetermined interval in the vicinity of a rear edge portion P on a door side of a mat M having a shape in which a rear portion on a center side of a vehicle is cut away and a rear side of a vehicle door side extends most backwardly, and the second retainer hole 2B on the vehicle center side of the two position retainer holes 2 is located in the vicinity of a rear edge portion P on the door side and in a rear extension position of a brake pedal 3, and the first retainer hole 2A on the vehicle door side is located on the end portion of the vehicle door side at a predetermined interval away from the second retainer hole 2B.

Also, according to a twenty-sixth aspect of the invention, an automotive vehicle floor mat according to the twenty-fifth aspect of the invention is characterized in that a rear portion on a center side of a vehicle is cut away from an end on the mat M on the center side of the vehicle to a central portion of the mat M so as to avoid a floor projecting portion 20 of a central lower portion of the driver's seat S, and retainer holes 2 for retaining, respectively, retainer pins 1 implanted on a vehicle floor side are provided at two positions at a predetermined interval in the vicinity of a rear edge portion P on the door side of the mat M having a shape in which a rear end portion on a vehicle door side is projected most backwardly and on the side on the vehicle door side to the floor projecting portion 20.

Also, according to a twenty-seventh aspect of the invention, the automotive vehicle floor mat according to either twenty-fifth or -sixth aspect of the invention is characterized in that a first position retainer hole 2A of the two position retainer holes 2 is provided on the vehicle door side to a position of a seat rail R for moving a driver's seat S back and forth, and a second retainer hole 2B is provided on the vehicle center side to the position of the seat rail R.

Also, according to a twenty-ninth aspect of the invention, an automotive vehicle floor mat M to be laid in a foot space of a driver's seat according to any one of the twenty-fifth to seventh aspect of the invention is characterized in that retainer holes 2 for retaining, respectively, retainer pins 1 implanted on a floor side of a vehicle are provided at two positions at a predetermined interval in the vicinity of a rear edge portion of the mat M, and a rear edge of the mat M between the two position retainer holes 2 is formed into a straight edge where no recess edge or cutaway directed upwardly is present.

Also, according to a thirtieth aspect of the invention, an automotive vehicle floor mat retainer unit T for retaining the automotive vehicle floor mat according to any one of the twenty-fifth to seventh and twenty-ninth aspect of the invention is characterized in that the retainer pins are implanted at positions where the retainer pins 1 are inserted into the two position holes 2 provided at the predetermined positions of the automotive vehicle floor mat M, in a substrate portion 6 for fixture to a vehicle body.

Also, according to a thirty-first aspect of the invention, the automotive vehicle floor mat retainer unit according to the thirtieth aspect of the invention is characterized in that the retainer pins are implanted in positions where the retainer pins 1 are inserted into the two position retainer holes 2 provided at predetermined positions of an automotive vehicle floor mat, in a substrate portion 6 for fixture to a vehicle body, and under the condition of fixture to the vehicle body, the two retainer pins are positioned in the vicinity of a rear edge portion P on a door side of the mat M having a shape in which a rear portion on a center side of a vehicle is cut away and a rear portion on the vehicle door side project most backwardly.

Also, according to a thirty-second aspect of the invention, the automotive vehicle floor mat retainer unit according to either thirtieth or thirty-first aspect of the invention is further characterized in that the two retainer pins 1 are in a juxtaposed condition in a right and left direction at an interval that is identified with an interval of the two position retainer holes 2, in a single substrate portion 6 covered by a rear edge portion of the automotive vehicle floor mat and provided with a fixture portion 7 for fixture to the vehicle body.

Also, according to a thirty-third aspect of the invention, the automotive vehicle floor mat retainer unit according to the thirty-second aspect of the invention is characterized in that a laterally extending substrate portion 6 is provided on a front side of a fixture portion 7 for fixture to the vehicle body to form a T-shape and the fixture portion 7 is fixed to the seat rail R to thereby be fixed to the vehicle body.

Also, according to a thirty-fourth aspect of the invention, the automotive vehicle floor mat retainer unit according to either thirtieth or thirty-first aspect of the invention is characterized by comprising the fixture portion 7 for fixture to the vehicle body and two substrate portions 6 each of which has the single retainer pin 1 implanted, and in that under the condition that each substrate portion 6 is fixed to the vehicle body by each fixture portion 7, the two retainer pins 1 are arranged at the positions where the pins are inserted into the retainer holes 2 of the automotive vehicle floor mat.

BEST MODE FOR EMBODYING THE INVENTION

A preferred embodiment of the present invention (how to embody the invention) will now briefly be described on the basis of the drawings with operational effect.

A fastener member in which retainer pins 1 are implanted is fixed to a vehicle body by utilizing, for example, a cross member on a rear side of a seat foot space. The two retainer pins 1 are implanted on the side of the vehicle floor. The vehicle floor mat M is laid so that two retainer holes 2 provided at two positions are fitted and retained (hooked and snapped) with these two retainer pins 1.

According to the present invention, the positions of these two retainer holes 2 (two retainer pins 1 fixed and implanted) are set in the following positions.

Figure 9:
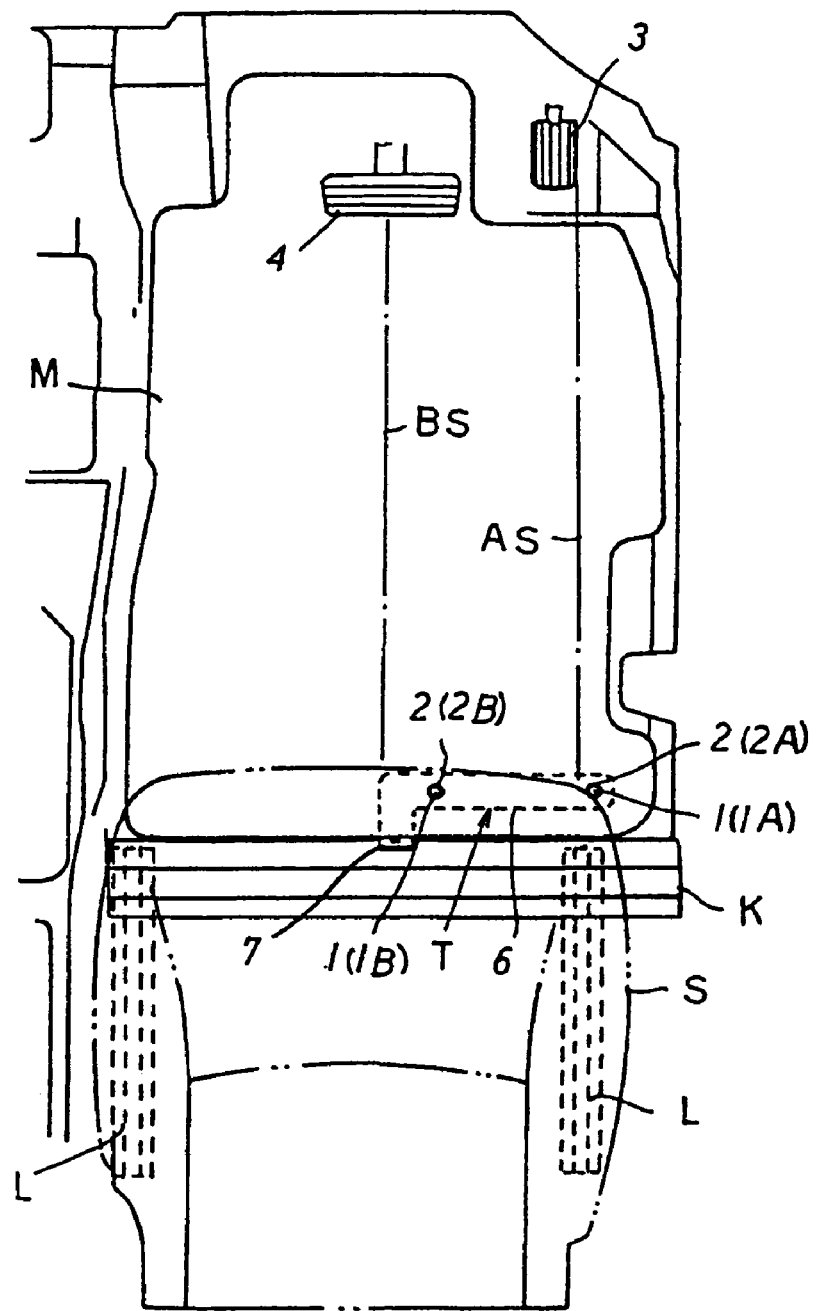
FIG. 9 is an illustrative plan view showing the use condition of the embodiment.
Figure 12:
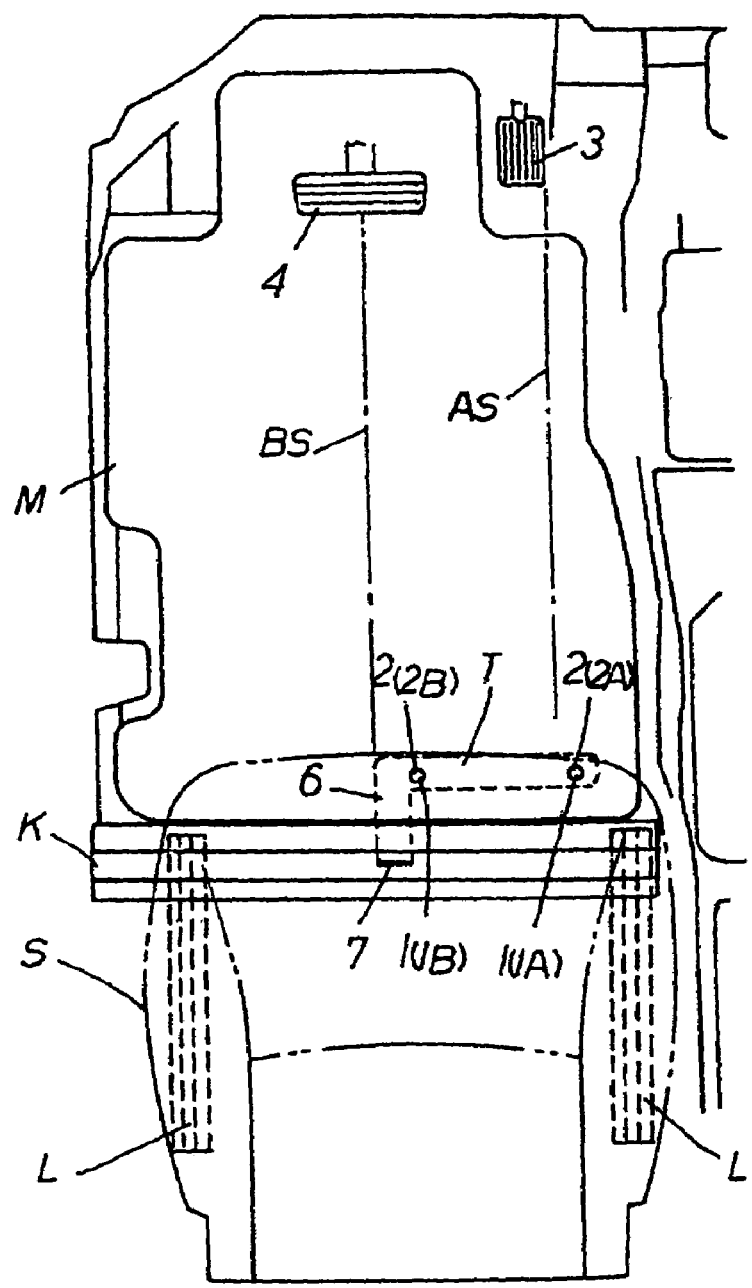
FIG. 12 is an illustrative plan view in the left steering wheel vehicle according to the embodiment (in the case where two retainer pins are implanted in a single substrate portion)
Figure 13:
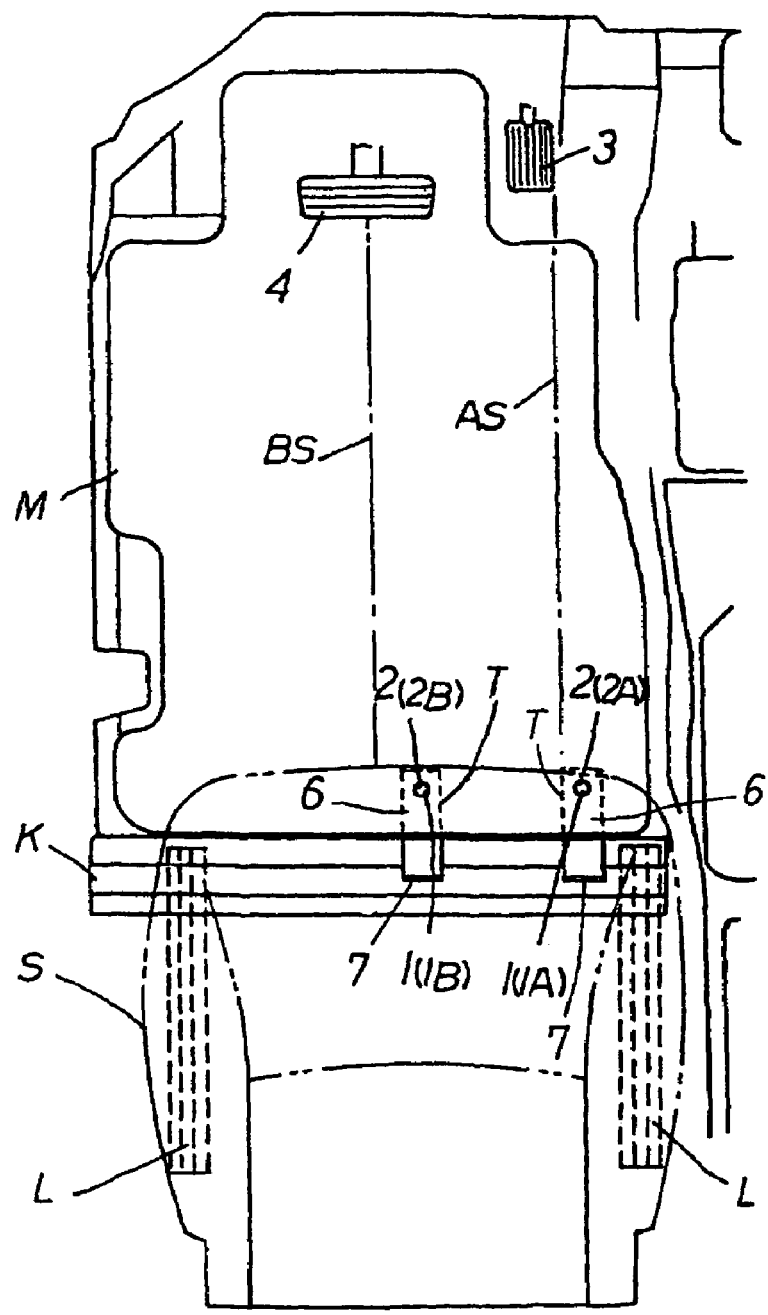
FIG. 13 is an illustrative plan view in the left steering wheel vehicle according to the embodiment (in the case where one retainer pin is implanted in each of two substrate portions)

Namely, as shown in, for example, FIGS. 9, 12 and 13, a first retainer hole 2A of the retainer holes 2 in the above-described two positions (first retainer pin 1A under the fixed condition) is provided in the vicinity of a rear extension portion of an accelerator pedal 3 on the rear and right side of the mat M and a second retainer hole 2B (second retainer pin 1B under the fixed condition) is provided in the vicinity of a rear extension portion of a brake pedal 4 rather on the central portion of the mat M than the above-described first retainer hole 2A (first retainer pin 1A).

Also, in, for example, FIG. 17, the first retainer hole 2A of the retainer holes 2 in the above-described two positions (first retainer pin 1A under the fixed condition) is provided in the vicinity of a rear extension portion of a floor projection 10 below the accelerator pedal 3 on a rear right side of the mat M, and the second retainer hole 2B (second retainer pin 1B under the fixed condition) is provided substantially in the vicinity of a rear extension portion of the brake pedal 4 on the central side of the mat M. The center interval between the above-described first retainer hole 2A (first retainer pin 1A) and the above-described second retainer hole 2B (second retainer pin 1B) is in the range of 100 mm to 200 mm.

Accordingly, the retainer pins 1 and the retainer holes 2 are provided at the two positions whereby it is possible to positively position the mat M upon laying the mat. In addition, the positions and the parallel arrangement interval of these retainer pins 1 and the retainer holes 2 are set in the suitable positions as described above, i.e., are not set at a wide interval like the full width of the mat M whereby it is unnecessary to take a structure for adjusting the interval between the retainer pins and to make it possible to cope with the change of the hole positions due to the aging change or the like and to make it possible to use the mat for a long period of time without any disadvantage that the retainer pins 1 could not be inserted into the retainer holes 2.

Also, it is possible to narrow the interval not too much to thereby make it possible to perform the positive positioning upon laying the mat M, i.e., to make it possible to lay and set the mat M even if the mat is used for a long period of time due to the rattling displacement of the retainer pins 1 and the retainer holes 2, to make it possible to cause the positional displacement upon laying and setting the mat M to fall within a range where no substantial problem is raised in both in the back-and-forth direction and the right and left rotational direction, and furthermore to keep the left foot of the driver to hardly come into contact with the retainer pins 1 to thereby bring about almost no fear that the shoe is damaged.

Also, the same advantage may be enjoyed even in either a left steering wheel vehicle or a right steering wheel vehicle. In the left steering wheel vehicle, the retainer holes 2 at the two positions and the retainer pins 1 at the two positions are arranged on the central side of the vehicle body.

Also, as shown in FIG. 13, in some cases, the mat M of the driver's seat, the intermediate portion and the navigator's seat are coupled with each other by hooks or the like. In these cases, it is possible to correctly perform the positioning of the mat upon laying the floor mat M of the driver's seat whereby the positioning of the coupled other mat M may be performed correctly.

Also, in the case where the mounting position of the vehicle floor mat fastener member T to the vehicle body is limited, the retainer pins 1 at the two positions are made of L-shaped type substrate portions 6 provided with fixed portions 7 for mounting with a length in the right and left directions, or the retainer pin 1 is provided to each of the substrate portions 6 obtained by separating the fastener member T into two components or the above-described L-shaped type one is adapted for the central fastener member T in the case where the mounting position in the two separate structure is limited. As a result, even if the mounting position is limited, it is possible to implant and arrange the two retainer pins 1 in the above-described suitable positions.

Also, in some cases, a projecting portion 10 is provided below the accelerator pedal 3, the floor mat M is laid, and at the same time, a right corner front edge portion of the floor mat M is brought into contact or in abutment with a stepped portion 13 between a rear end portion of this projecting portion 10 and the floor surface so that the mat M may correctly and easily be positioned in place. It is possible to further enhance the positioning effect of the mat M by machining the front right corner portion of this mat M.

Also, for example, a fastener member 5 in which the retainer pins 1 are fixed to the vehicle by utilizing a vehicle floor surface or a seat rail R for moving back and forth a cross member or a seat (driver's seat S) projecting from the vehicle floor surface. The two retainer pins 1 are implanted on the vehicle floor side. The retainer holes 2 formed at the two positions are fitted (insertion hooked) with the two retainer pins 1 to thereby lay the automotive vehicle floor mat M.

According to the present invention, the positions of the two position retainer holes 2 (two retainer pins 1 fixed and implanted) are set up as follows.

For example, as shown in FIGS. 26 to 31, the above-described two position retainer holes 2 are provided in the vicinity of a door side rear edge portion P of the mat M having a shape whose rear portion on the vehicle center side is cut away and whose rear portion on the vehicle door side is projected most rearward.

More specifically, irrespective of the right steering wheel vehicle or left steering wheel vehicle, the retainer holes 2 are formed in parallel at two positions at a predetermined interval in the vicinity of the mat rear edge portion P on the side of the door of the driver's seat. One (first retainer hole 2A) of these holes is provided at the position on the mat side edge on the door side, whereas the other (second retainer hole 2B) is provided in parallel on the center side of the vehicle at a predetermined interval separately from the first retainer hole 2A.

Explaining more specifically, the above-described two position retainer holes 2 are provided on the side portion on the vehicle door side of the floor projecting portion 10 and in the vicinity of the door side rear edge portion P of the mat M having, for example, the shape whose rear portion on the vehicle center side is cut away in order to avoid the floor projecting portion 10 of the vehicle center side lower portion of the driver's seat S from the mat M side edge on the vehicle center side to the vicinity of the center of the mat M and whose rear portion of the vehicle door is projected most rearward.

Figure 29:
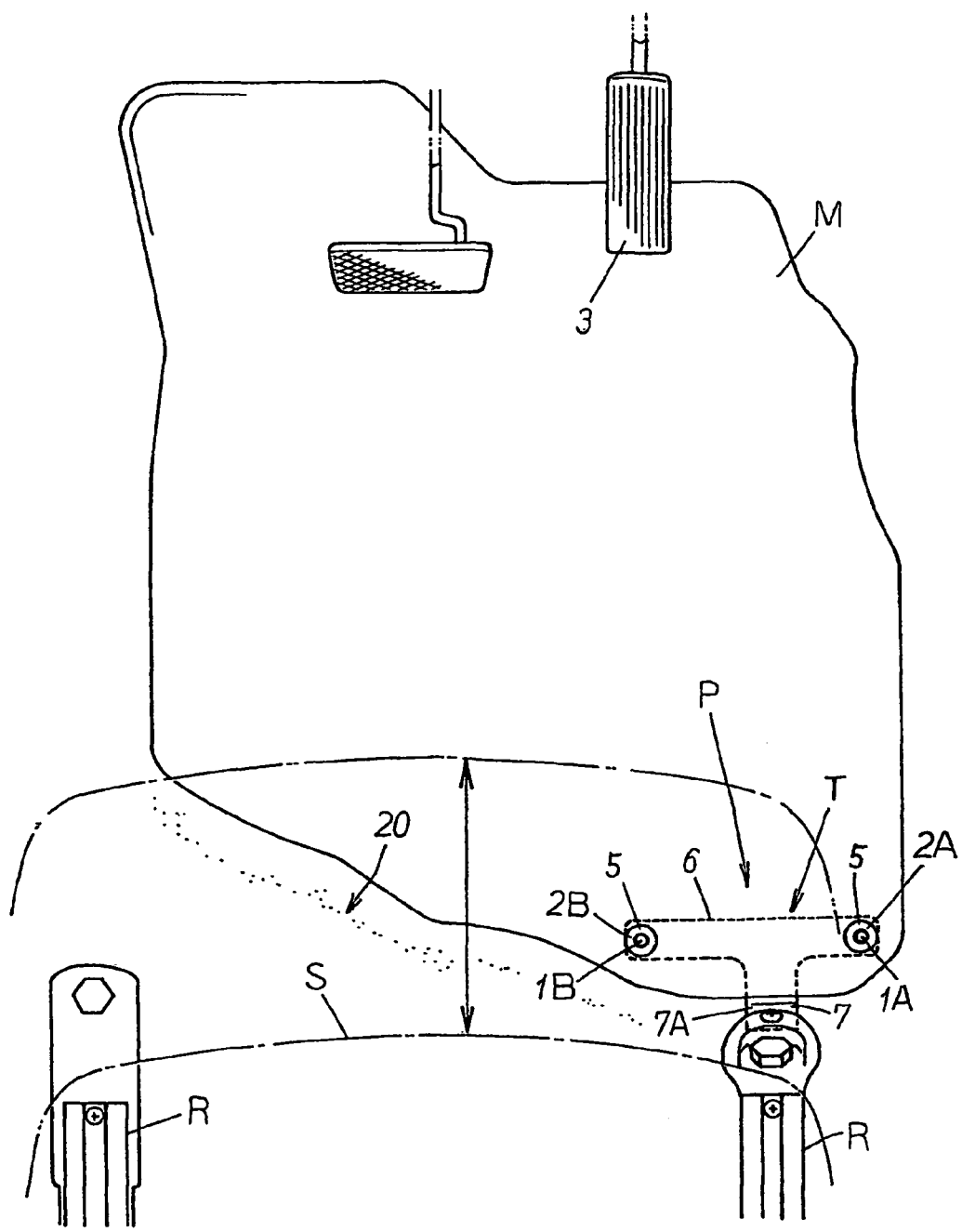
FIG. 29 is an illustrative plan view showing a use condition of the embodiment.
Figure 30:
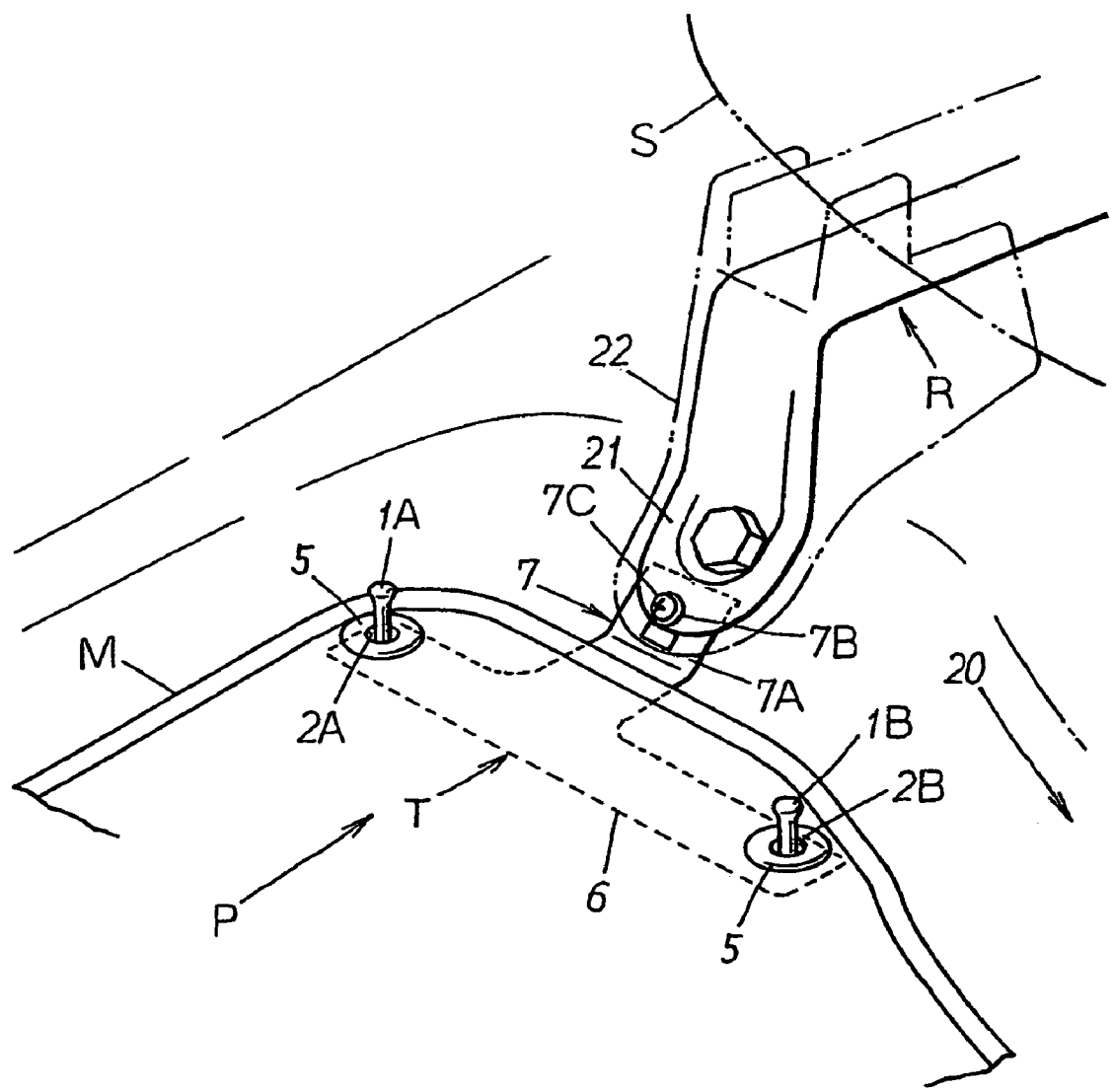
FIG. 30 is an illustrative perspective view of a primary part of the use condition in accordance with the embodiment.
Figure 31:
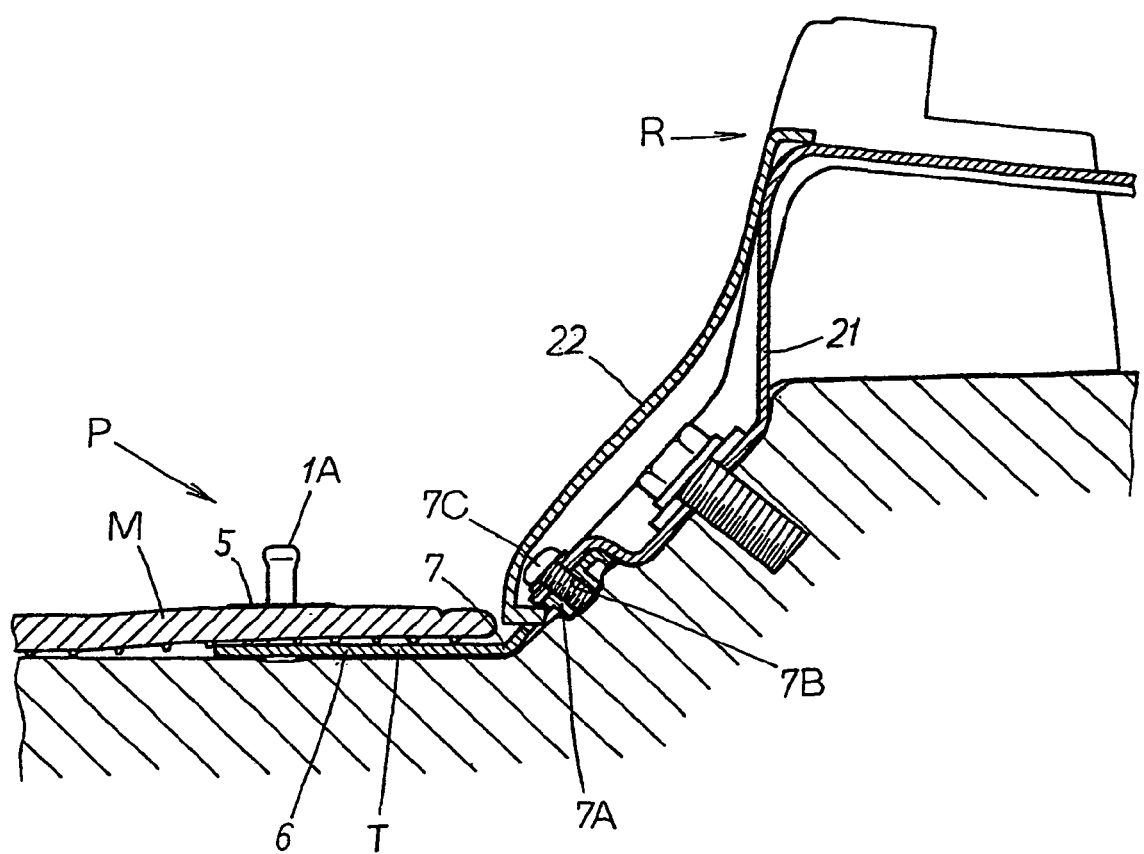
FIG. 31 is an illustrative side-elevational cross-sectional view of the primary part of the use condition in accordance with the embodiment.
Figure 32:
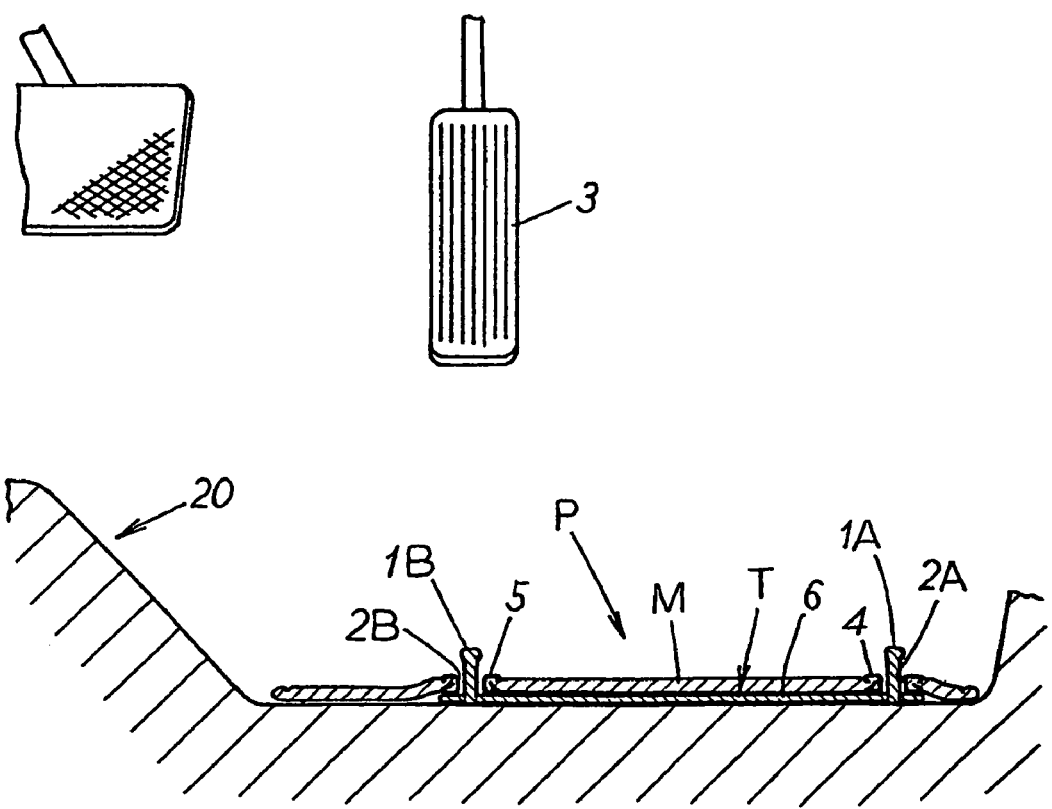
FIG. 32 is an illustrative frontal cross-sectional view showing the use condition of the embodiment.

Namely, for example, in the right steering wheel vehicle, as shown in FIG. 29, the above-described left side second retainer hole 2B is located in the vicinity of the door side rear edge portion P of the right and rear side of the mat and in the vicinity of the rear extension position of the accelerator pedal 3, whereas the above-described right side first retainer hole 2A is located in the vicinity of the side edge on the vehicle door side and on the right side separated at a predetermined interval from the above-described second retainer hole 2B.

Accordingly, the retainer pins 1 and the retainer holes 2 are provided at the two positions whereby it is possible to positively position the mat M upon laying the mat. In addition, the positions and the parallel arrangement interval of these retainer pins 1 and the retainer holes 2 are set in the suitable positions as described above, i.e., are not set at a wide interval like the full width of the mat M whereby it is unnecessary to take a structure for adjusting the interval between the retainer pins and to make it possible to cope with the change of the hole positions due to the aging change or the like and to make it possible to use the mat for a long period of time without any disadvantage that the retainer pins 1 could not be inserted into the retainer holes 2.

Also, it is possible to narrow the interval not too much to thereby make it possible to perform the positive positioning upon laying the mat M, i.e., to make it possible to lay and set the mat M even if the mat is used for a long period of time due to the rattling displacement of the retainer pins 1 and the retainer holes 2, to make it possible to cause the positional displacement upon laying and setting the mat M to fall within a range where no substantial problem is raised in both in the back-and-forth direction and the right and left rotational direction, and furthermore to keep the driver's shoe to hardly come into contact with the retainer pins 1 to thereby bring about almost no fear that the shoe is damaged.

Also, the same advantage may be enjoyed even in either a left steering wheel vehicle. The retainer holes 2 at the two positions and the retainer pins 1 at the two positions are arranged on the vehicle door side.

Also, in the case of the mat M having, for example, the shape whose rear portion on the vehicle center side is cut away in order to avoid the floor projecting portion 10 of the vehicle center side lower portion of the driver's seat S from the mat M side edge on the vehicle center side to the vicinity of the center of the mat M so that the mat may be laid only on the flat floor surface, the retainer holes 2 (2A and 2B) are provided in the vicinity of the door side rear edge portion P of the mat M extending in the vehicle rear portion of the mat M. Accordingly, the retainer pins 1 are not located on the front side so that there is almost no fear that the right and left shoes would be damaged.

Also, in some cases, the mat M of the driver's seat, the intermediate portion and the navigator's seat are coupled with each other by hooks or the like. In these cases, it is possible to correctly perform the positioning of the mat upon laying the floor mat M of the driver's seat whereby the positioning of the coupled other mat M may be performed correctly.

Also, in the case where the mounting position of the vehicle floor mat fastener member 5 to the vehicle body is limited, the retainer pins 1 at the two positions are made of L-shaped or T-shaped type substrate portions 6 provided with fixed portions 7 for mounting with a length in the right and left directions, or the retainer pin 1 is provided to each of the substrate portions 6 obtained by separating the fastener member 5 into two components or the above-described L- or T-shaped type one is adapted for the central fastener member 5 in the case where the mounting position in the two separate structure is limited. As a result, even if the mounting position is limited, it is possible to implant and arrange the two retainer pins 1 in the above-described suitable positions.

Also, a fixture portion 7 is provided to project from the central portion of the substrate portion 6 provided with the two retainer pins 1 to form the fastener member 5 into a T-shape type one, thereby enhancing the mechanical strength. Also, the fixture portion 7 is mounted on the seat rail R on the vehicle door side so that the retainer pins 1 may readily be arranged on the right and left positions with respect to the border of the seat rail R on the vehicle door side. It is therefore possible to arrange each retainer pin 1 in the above-described suitable position with ease.

An embodiment of the present invention will now be described with reference to the accompanying drawings. Incidentally, it is possible to adopt a structure provided with each structural component recited in the appended claims or it is possible to selectively use the structural components in combination from each appended claim. Namely, it is possible to consider the embodiment that is directed to the combination of all the elements. However, such an embodiment has been herein omitted but only the embodiments shown will now be described.

An automotive vehicle floor mat M according to this embodiment is made of, for example, cloth (woven cloth) or rubber (resin) solely or in combination thereof. For one having a carpet-like surface or a synthetic resin rubber (rubber) surface, retainer holes 2 for retaining retainer pins 1 implanted on the side of the vehicle floor are provided at two positions at a predetermined interval in the vicinity of a rear edge portion of the mat M. (As shown in the drawings, the retainer holes are located at the positions that could not be seen from above by the seat S that is moved back and forth along seat rails L.) A first retainer hole 2A of the above-described two position retainer holes 2 is provided on the right rear side of the mat M and in the vicinity of a rear extension portion of an accelerator pedal 3, whereas a second retainer hole 2B is provided rather on the center side of the mat M than the above-described first retainer hole 2A and in the vicinity of a rear extension portion of a brake pedal 4.

More specifically, a center of the above-described first retainer hole 2A (first retainer pin 1A under the fixed condition) is located on the right side of the left edge extension line of the accelerator pedal 3 or a right edge extension line of the accelerator pedal 3 (right edge extension line AS of the drawings), whereas a center of the above-described second retainer hole 2B (second retainer pin 1B under the fixed condition) is located on the right side of the left edge extension line of the brake pedal 4 or a center extension line of the brake pedal 4 (center extension line BS of the drawings). The center interval of the two position retainer holes 2 (retainer pins 1) is in the range of 100 mm to 250 mm.

Also, a fastener or retainer member 5 (doughnut-shape as viewed from above and C-shaped cross-section, for example) having a rigidity and made of metal or non-metal (for example, resin may be used) is provided in an inner edge of each retainer hole 2. This fastener member 5 has a thickness that is smaller than a height of the above-described retainer pin 1.

Namely, since the mat is laid so that the retainer holes 2 are arranged in such positions, the positions of the two position retainer pins 1 of the fastener member T to be inserted into these retainer holes 2 are set up so as to be located in the above-described positions.

Namely, in the fastener member T according to this embodiment, the above-described retainer pins 1 are implanted in the substrate portion 6 to be fixed to the vehicle body at the two positions where the retainer pins 1 are inserted into the retainer holes 2 provided in the above-described predetermined positions of the above-described automotive vehicle floor mat M.

More specifically, the two retainer pins 1 are implanted under the juxtaposed condition in the right and left direction at an interval that is identified with the interval between the two position retainer holes 2 in the single substrate portion 6 that has a length in the right and left direction and that is covered by the rear edge portion of the above-described automotive vehicle floor mat M and provided with a fixture portion 7 for fixture to the vehicle body. The fastener member is composed of the fixture portion 7 for fixture to the above-described vehicle body, the substrate portion 6 in which the above-described two retainer pins 1 are implanted and a rotation preventing portion 8 retained at the vehicle body for preventing the substrate portion 6 from rotating. The fastener member is integrally formed by the work of bending a single metal plate so that the components 6, 7 and 8 are kept under the L-shaped relation with each other.

Namely, in this embodiment, an end portion of the central side of a laterally extending plate in which the two retainer pins 1 are implanted at a predetermined interval is bent backwardly to form the L-shaped substrate portion 6. This backwardly bent portion of the substrate portion 6 is bent upwardly into an L-shape to form a contact plate portion 7A to be brought into contact with a front rising surface of a cross member K formed in the rear portion of the foot space of the seat. A screw mounting hole 7B is formed in this contact plate portion 7A to form the fixture portion 7. This contact plate portion 7A is brought into contact with the rising surface of the cross member K. A grommet 11 is fitted in a screw hole formed in the cross member K. A screw 12 is screwed and fixed through the screw mounting hole 7B and through the grommet 11.

Also, the side portion of the backwardly bent portion of the substrate portion 6 is bent in an L-shape downwardly and inserted into a retainer groove formed in the automotive vehicle body for retention to form the rotation preventing portion 8.

Figure 5A:
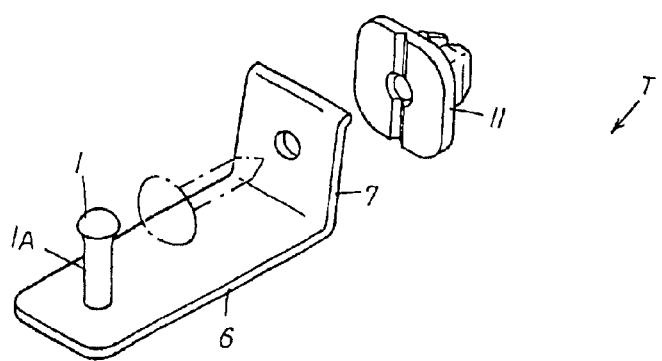
FIGS. 5a and 5b are perspective views of still another example 3 in accordance with the embodiment.
Figure 5B:
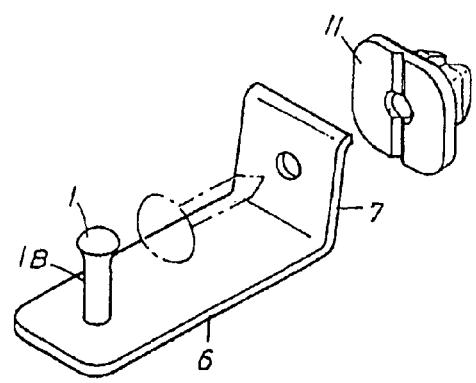
Figure 10:
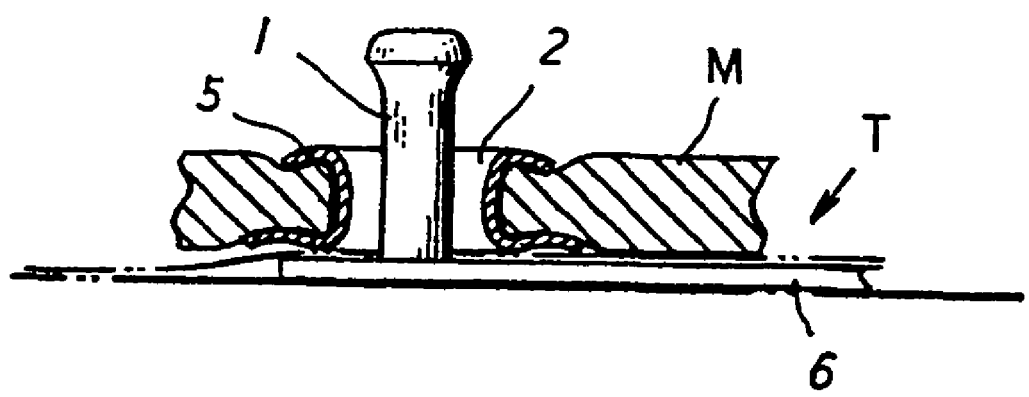
FIG. 10 is an illustrative cross-sectional view of a primary part showing the use condition of the embodiment.
Figure 11:
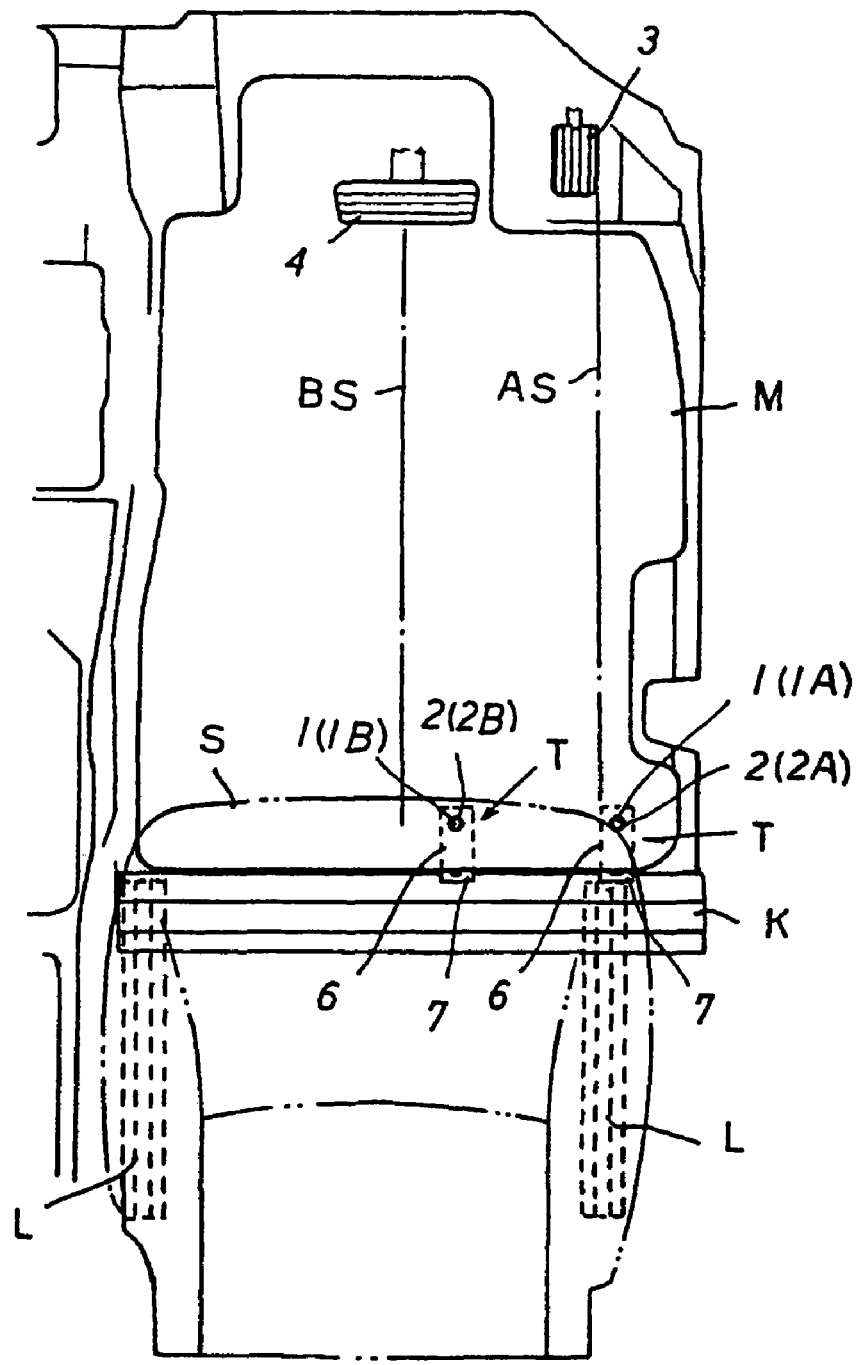
FIG. 11 is an illustrative plan view showing the other example 3 in the use condition of the embodiment.

Also, instead of the single fastener member 5 as in the foregoing embodiment, as shown in FIGS. 5a, 5b and 10, it is possible to provide two substrate portions 6 provided with the fixture portions 7 to be fixed to the above-described vehicle body and each of which is provided with the single pin 1 and to arrange each substrate portion 6 in the position where the above-described two retainer pins 1 are inserted into the retainer holes 2 of the above-described automotive vehicle floor mat M under the condition that each substrate portion 6 is fixed to the vehicle body by each fixture portion 7. In this case, the pair of two fastener units are used to increase the number of the components but it is possible to reduce the weight and to miniaturize the size thereof. Also, in this case, it is necessary to set suitably the two position mounting positions to the cross member K.

Figure 3:
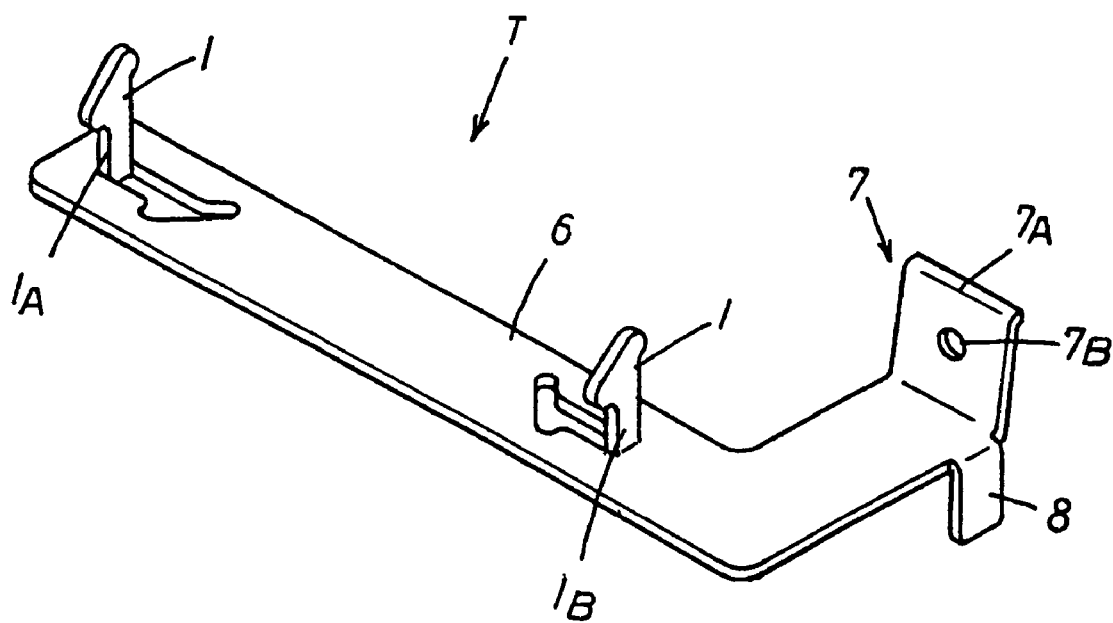
FIG. 3 is a perspective view of another example 1 in accordance 1 with the embodiment.
Figure 7:
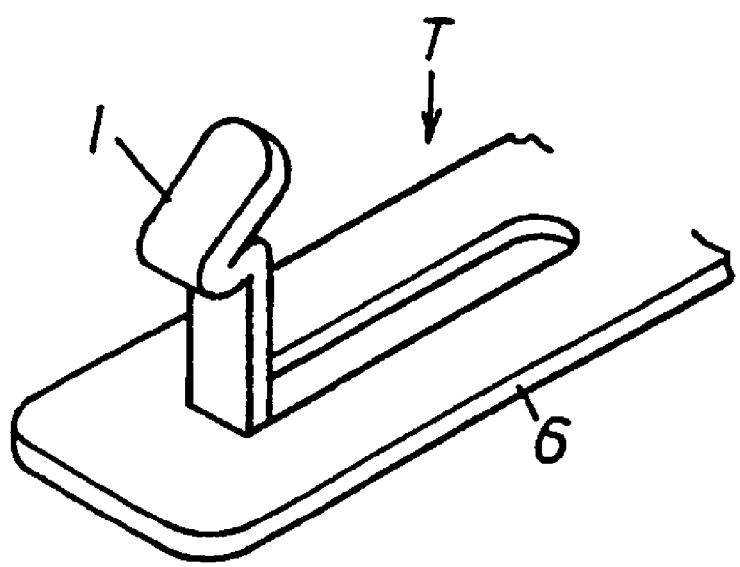
FIG. 7 is a perspective view of still another example 5 in accordance with the embodiment.
Figure 8:
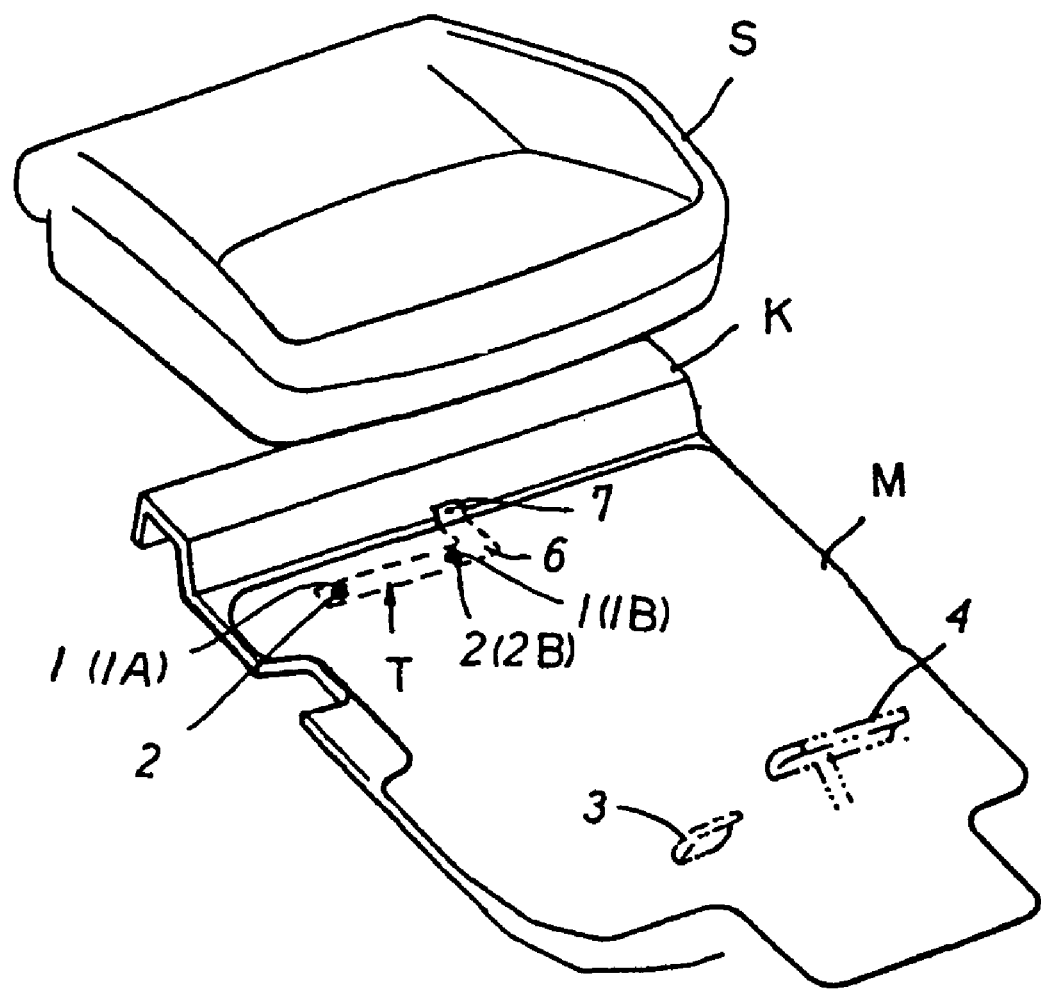
FIG. 8 is an illustrative perspective view showing a use condition of the embodiment.

Also, as shown in FIGS. 3 and 7, it is possible to take a structure in which a head portion of the above-described retainer pin 1 is formed to expand widely at least back and forth direction from a shaft portion and slanted obliquely upwardly toward the rear portion. In this case, the head portion is hardly pulled apart from the retainer hole 2 of the mat M and a height of the retainer pin 1 may be reduced.

Figure 6:
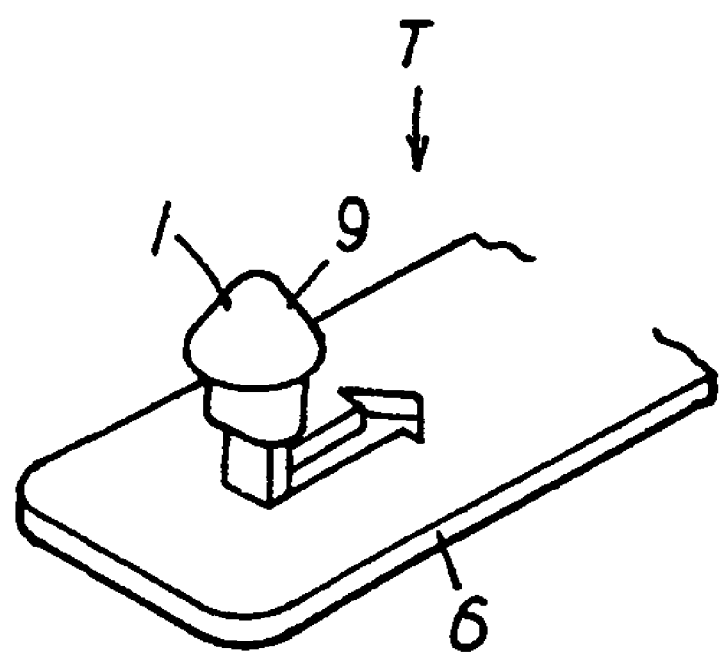
FIG. 6 is a perspective view of still another example 4 in accordance with the embodiment.

Also, as shown in FIG. 6, a mushroom-shaped cap 9 made of hard rubber (resin) may be fitted around a tip end of the above-described retainer pin 1 to form a head portion of the above-described retainer pin 1. In this case, even if this portion is brought into contact with the shoes, the shoe is not damaged.

Also, as shown in FIGS. 3, 4a, 4b, 6 and 7, the above-described retainer pin 1 may be cut and raised from the above-described substrate portion 6. In this case, the number of the parts may be reduced in comparison with the case where the retainer pin 1 is welded.

Figure 4A:
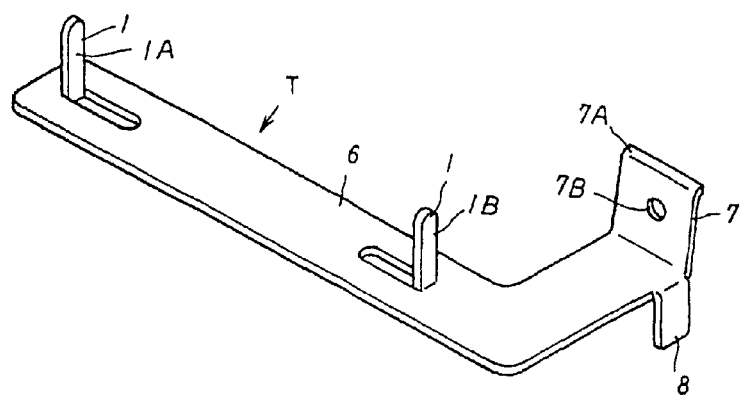
FIGS. 4a and 4b are perspective views of other examples 2 in accordance with the embodiment.
Figure 4B:
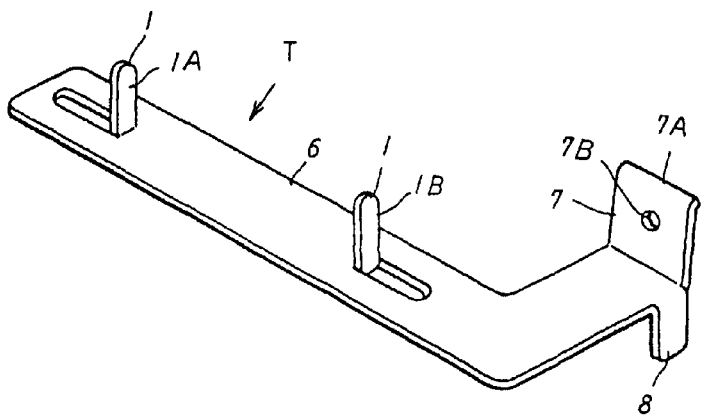

Incidentally, as shown in FIGS. 3, 4a and 4b, the direction of cutting and raising is caused to be in the longitudinal direction of the substrate portion 6 so that the retainer pin 1 having a sufficient height may be cut and raised. In this case, the cutting and raising work is conducted so that the raised width is greater than the thickness of the plate whereby the width in the back-and-forth direction of the retainer pin 1 is greater than the width in the right and left direction (plate thickness) to thereby enhance the mechanical strength of the retainer pin 1.

Also, as shown in FIGS. 4a and 4b, the cutting and raising direction may be either in the right or left direction.

Figure 15:
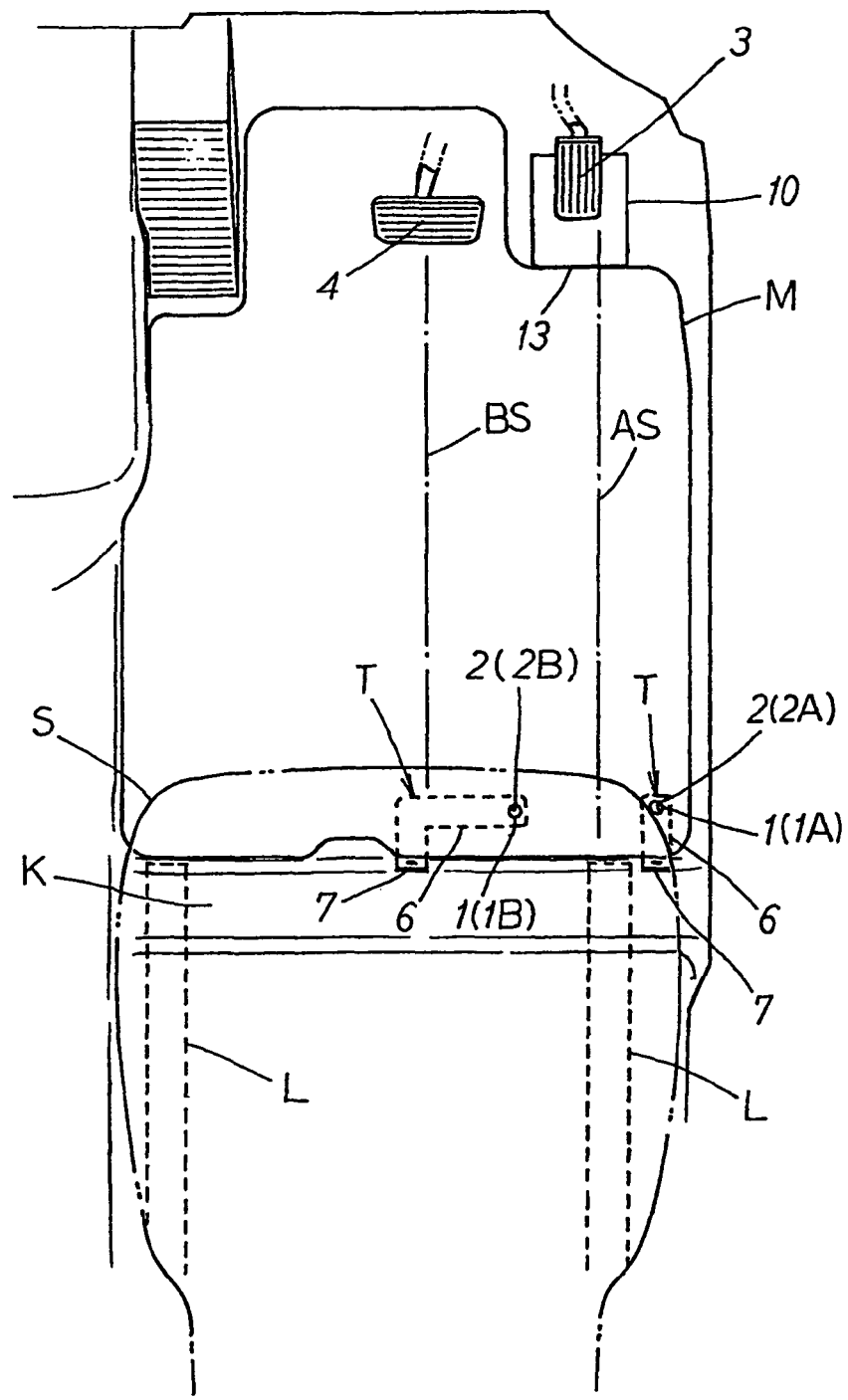
FIG. 15 is an illustrative plan view showing a use condition of the embodiment.
Figure 16:
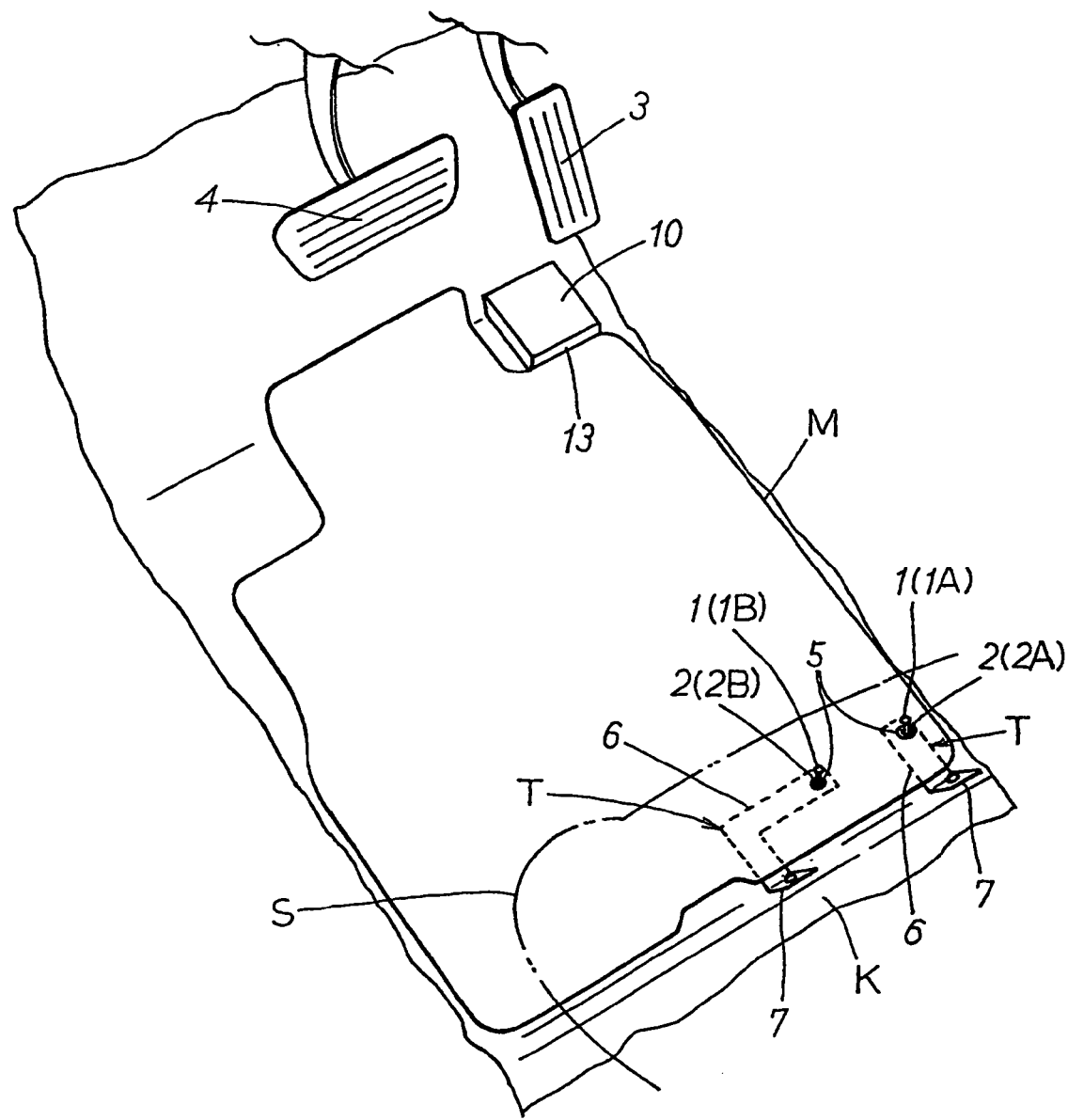
FIG. 16 is an illustrative perspective view showing the use condition of the embodiment.

In an embodiment shown in FIGS. 15 and 16, the two substrate portions 6 are each provided with the single retainer pin 1 and the fixture portion 7 for fixture to the vehicle body. The above-described two retainer pins 1 are arranged to the positions where the pins are inserted into the retainer holes 2 of the above-described automotive vehicle floor mat M under the condition that each substrate portion 6 is fixed to the vehicle body by the fixture portion 7. The above-described substrate portion 6 located on the right side is of a straight type with a length in the back-and-forth direction and with the above-described fixture portion 7 at its rear end portion. The above-described other substrate portion 6 located on the left side is of an L-shaped type with an L-shape and a long side having a length in the right and left direction and provided with the above-described fixture portion 7 at the rear end portion of a short side portion in the back-and-forth direction. The above-described retainer pins 1 are arranged in the positions so as to be inserted into the retainer holes 2 of the above-described automotive vehicle floor mat M under the condition that each substrate portion 6 is fixed to the vehicle body by each fixture portion 7.

Figure 17:
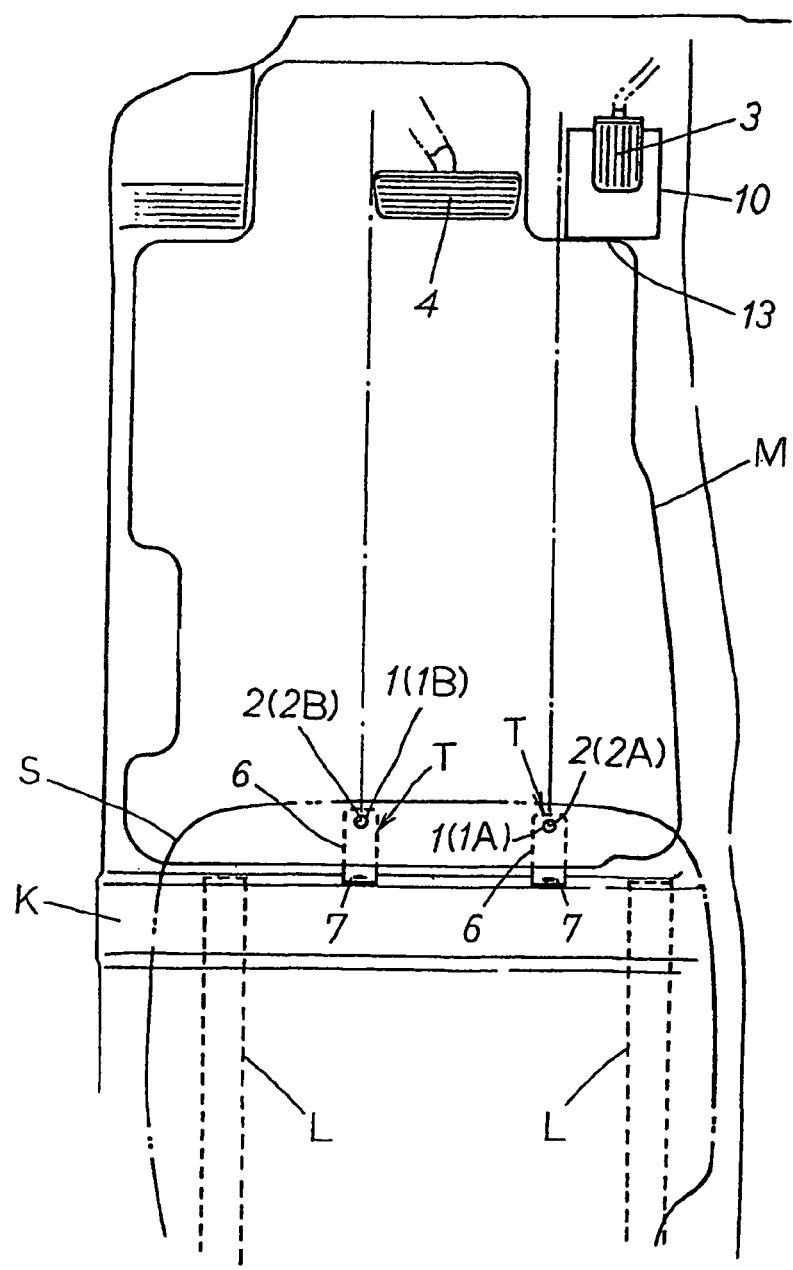
FIG. 17 is an illustrative plan view showing the use condition of the left steering wheel vehicle according to the embodiment.
Figure 18:
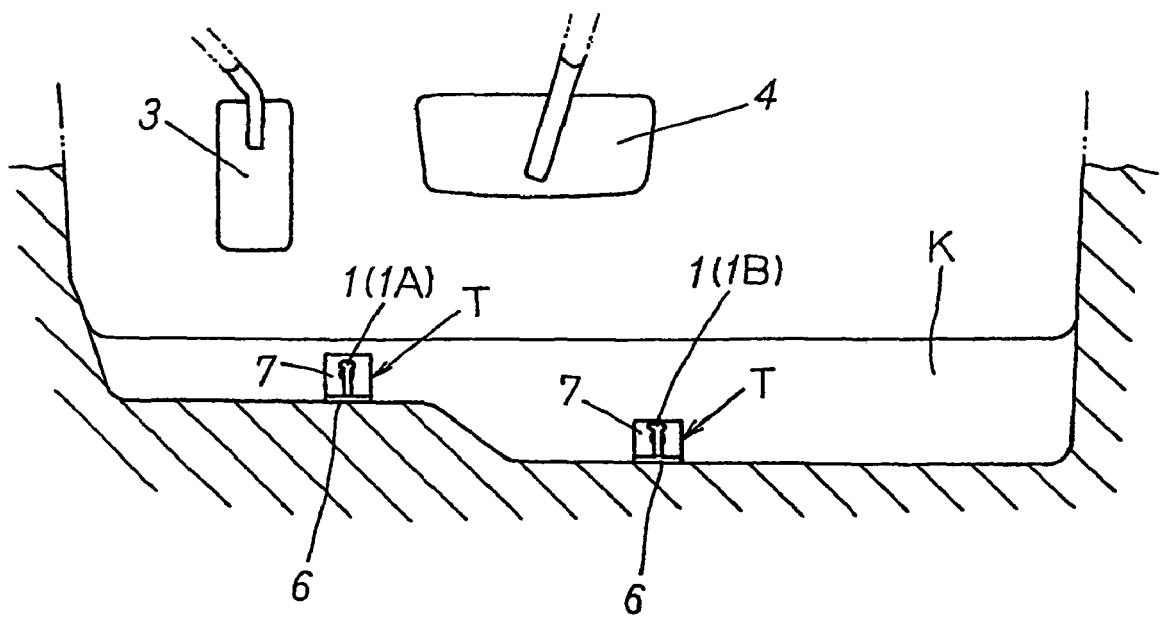
FIG. 18 is an illustrative cross-sectional view of the use condition of the left steering wheel vehicle according to the embodiment as viewed from the front side.
Figure 19:
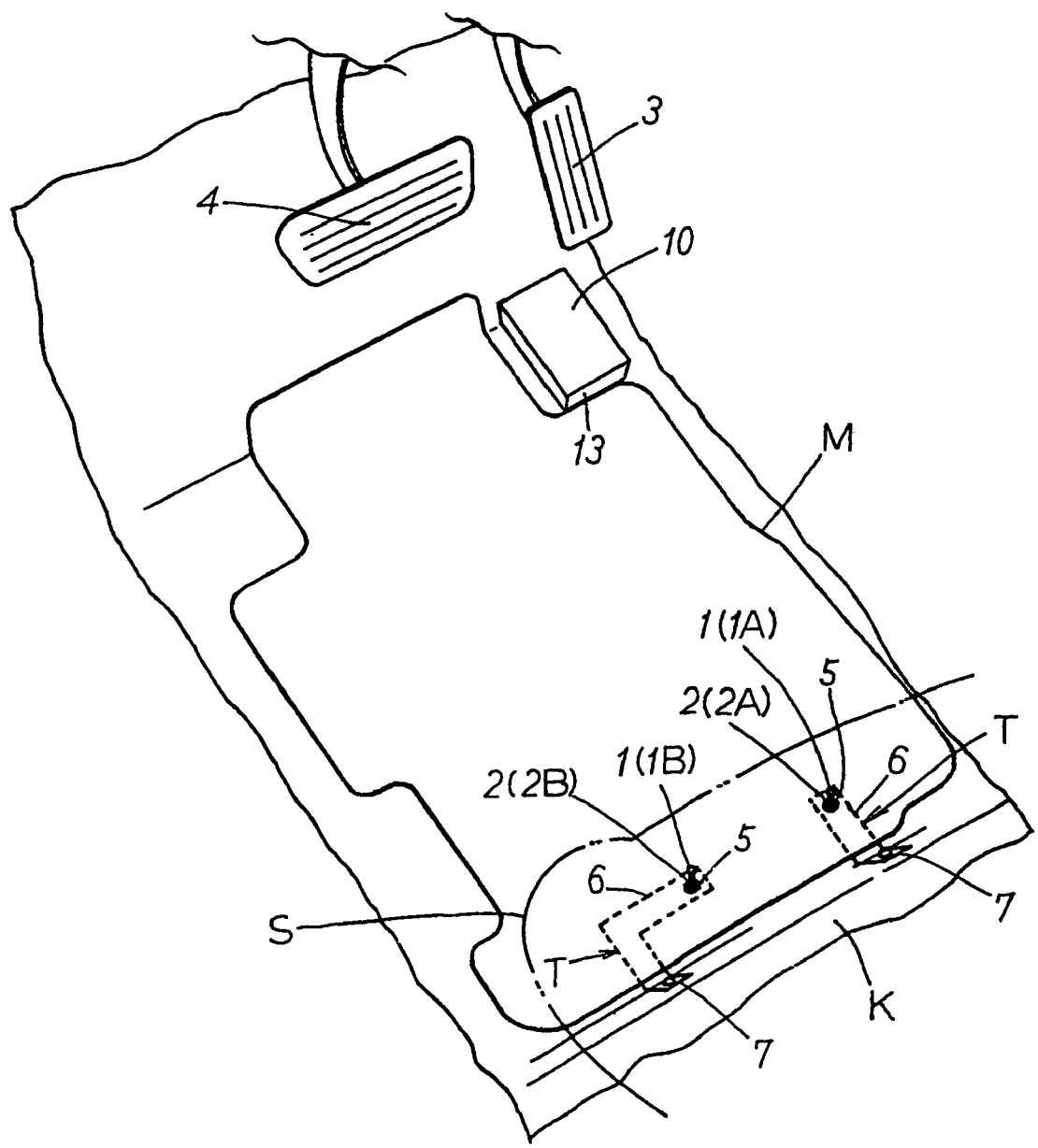
FIG. 19 is an illustrative perspective view showing the use condition of the left steering wheel vehicle according to the embodiment.

Also, in an embodiment shown in FIGS. 17, 18 and 19, the retainer holes 2 retained at the retainer pins 1 implanted on the floor side of the vehicle body of the left steering wheel vehicle are provided at the two at a predetermined interval in the vicinity of the rear edge portion of the mat M. (As shown in the drawings, the retainer holes are located at the positions that could not be seen from above by the seat S that moves back and forth along the seat rails L.) The first retainer hole 2A of the above-described two position retainer holes 2 is provided in the vicinity of the rear extension portion of the floor projecting portion 10 below the accelerator pedal 3 and on the right rear side of the mat M, whereas the second retainer hole 2B is provided substantially in the vicinity of the rear extension portion of the brake pedal 4 rather on the central portion of the mat M than the above-described first retainer hole 2A.

More specifically, the two retainer holes 2 for retaining the retainer pins 1 implanted on the vehicle floor side, respectively, are provided at a predetermined interval in the vicinity of the rear edge portion of the mat M. The first retainer hole 2A of the above-described two position retainer holes 2 is provided on the right and rear side of the mat M and in the rear extension portion of the left side edge portion of the floor projection portion 10 below the accelerator pedal 3 located between the accelerator pedal 3 and the brake pedal 4. The second retainer hole 2B is substantially in the rear extension portion of the left side edge portion of the brake pedal 4 rather on the central portion of the mat M than the above-described first retainer hole 2A.

Also, the center interval between the above-described first retainer hole 2A and the above-described second retainer hole 2B is in the range of 100 mm to 200 mm. Each retainer hole 2A, 2B and the above-described retainer pin 1 engaged with each associated retainer hole 2A, 2B is set to be in the position where the hole is hidden below the driver's seat portion S.

Also, a fastener or retainer member 5 (doughnut-shape as viewed from above and C-shaped cross-section, for example) having a rigidity and made of metal or non-metal (for example, resin may be used) is provided in an inner edge of each retainer hole 2. This fastener member 5 has a thickness that is smaller than a height of the above-described retainer pin 1.

Namely, since the mat is laid so that the retainer holes 2 are arranged in such positions, the positions of the two position retainer pins 1 of the fastener member T to be inserted into these retainer holes 2 are set up so as to be located in the above-described positions.

Namely, in the fastener member T according to this embodiment, the fixture portion 7 for fixture to the vehicle body is provided at its rear end portion and having two straight type substrate portions 6 each of which has the single retainer pin 1 implanted, and in that under the condition that each substrate portion 6 is fixed to the vehicle body by each fixture portion 7, the two retainer pins 1 are arranged at the positions where the retainer pins 1 are inserted into the retainer holes 2 of the above-described automotive vehicle floor mat M.

Also, as shown in FIG. 18, the positions of height of the first retainer pin 1A and the second retainer pin 1B are different in accordance with the height of the floor surface.

Also, in an embodiment shown in FIGS. 20, 21a, 21b and 21c, a heel step portion 15 of a front right corner, onto which the heel portion of the right foot stepping the accelerator pedal 3, of an automotive vehicle floor mat M to be laid in a foot space of the driver's seat and to be laid to be brought into abutment with a stepped portion 13 between the floor surface and a rear end portion of a projection portion 10 below the accelerator pedal 3 is cured and set to be a thickness at which the above-described stepped portion 13 for positioning the mat M under the condition that the mat M is laid is ensured.

More specifically, a pad member 16 (heel pad) is bonded by melt-bonding to the heel step portion 15 at the front right corner of this mat M so that this portion is cured and at the same time, is set at a predetermined thickness dimension so that the above-described stepped portion 13 may be ensured or kept for positioning the mat M under the mat M is laid.

Figure 20:
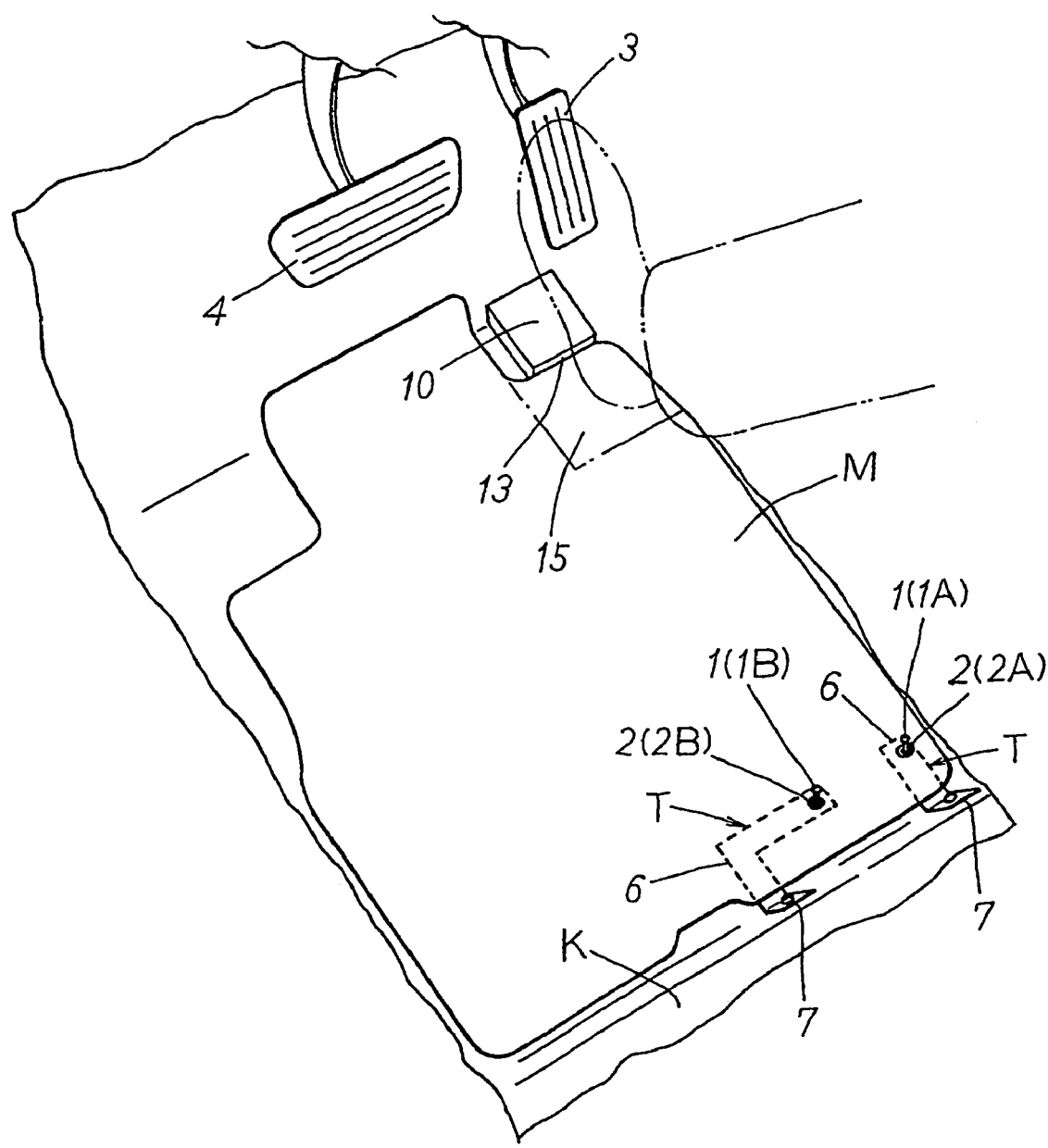
FIG. 20 illustrative perspective views showing the use condition of the embodiment.
Figure 21A:
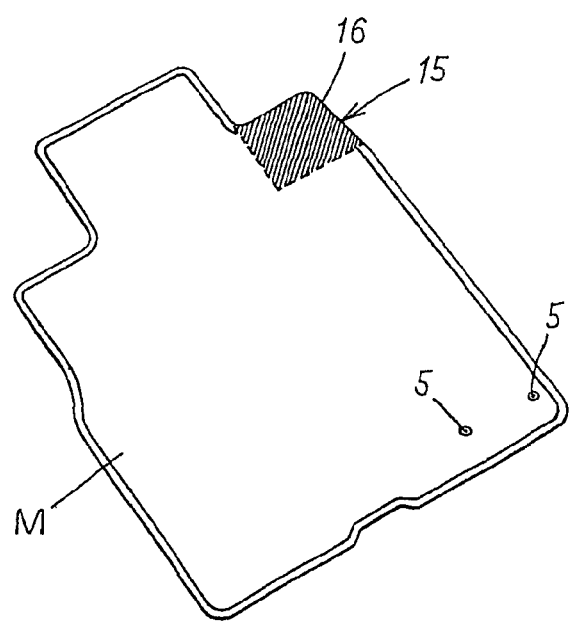
FIGS. 21a, 21b and 21c are illustrative, fragmentary and cross-sectional views showing an example 1 of the embodiment where a heel stepped portion is formed.
Figure 21B:
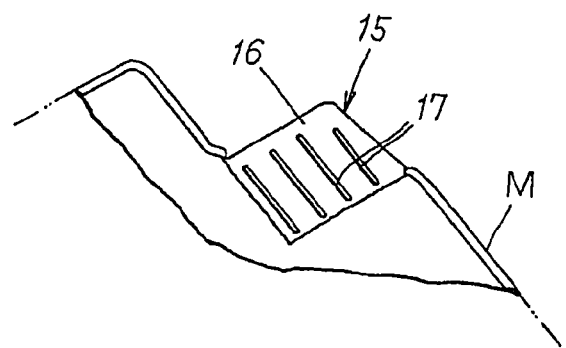
Figure 21C:
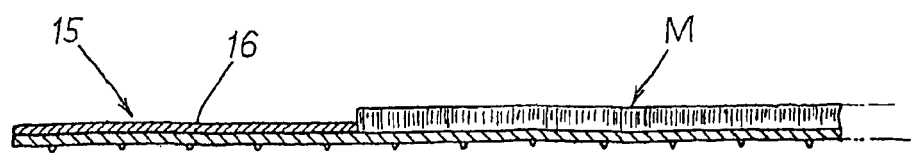

In the embodiment shown in FIG. 20, the heel pad 16 such as a rubber plate is welded or melt-heated to the front right corner portion of the mat M that has been subjected to an edge process (overlock process) so that shaggy on the surface of this portion is removed to provide the mat M whose thickness is ensured at the predetermined thickness. In order to obtain a suitable slippage resistance value rather than a simple slippage proof, it is possible to form heel slippage preventing grooves 17 on the surface of the heel pad 16.

Figure 22A:
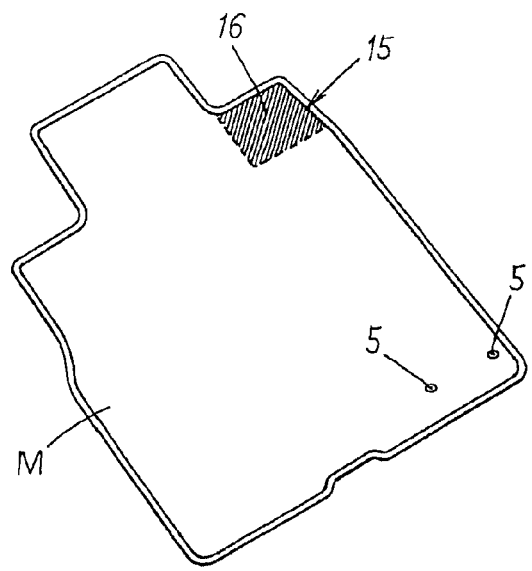
FIGS. 22a, 22b and 22c are illustrative, fragmentary and cross-sectional views showing an example 2 of the embodiment where a heel stepped portion is formed.
Figure 22B:
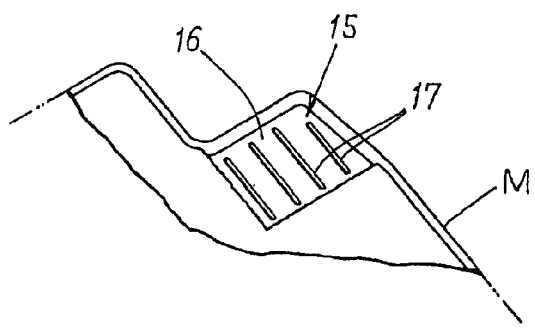
Figure 22C:
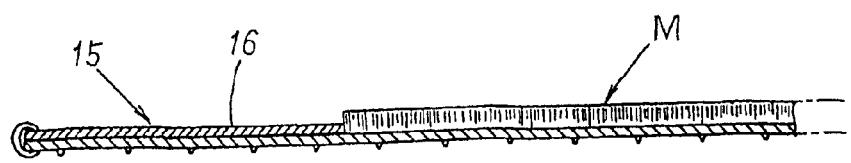

Also, in an embodiment shown in FIGS. 22a, 22b and 22c, after the pad member 16 is welded, the overlock process is effected.

Figure 23:
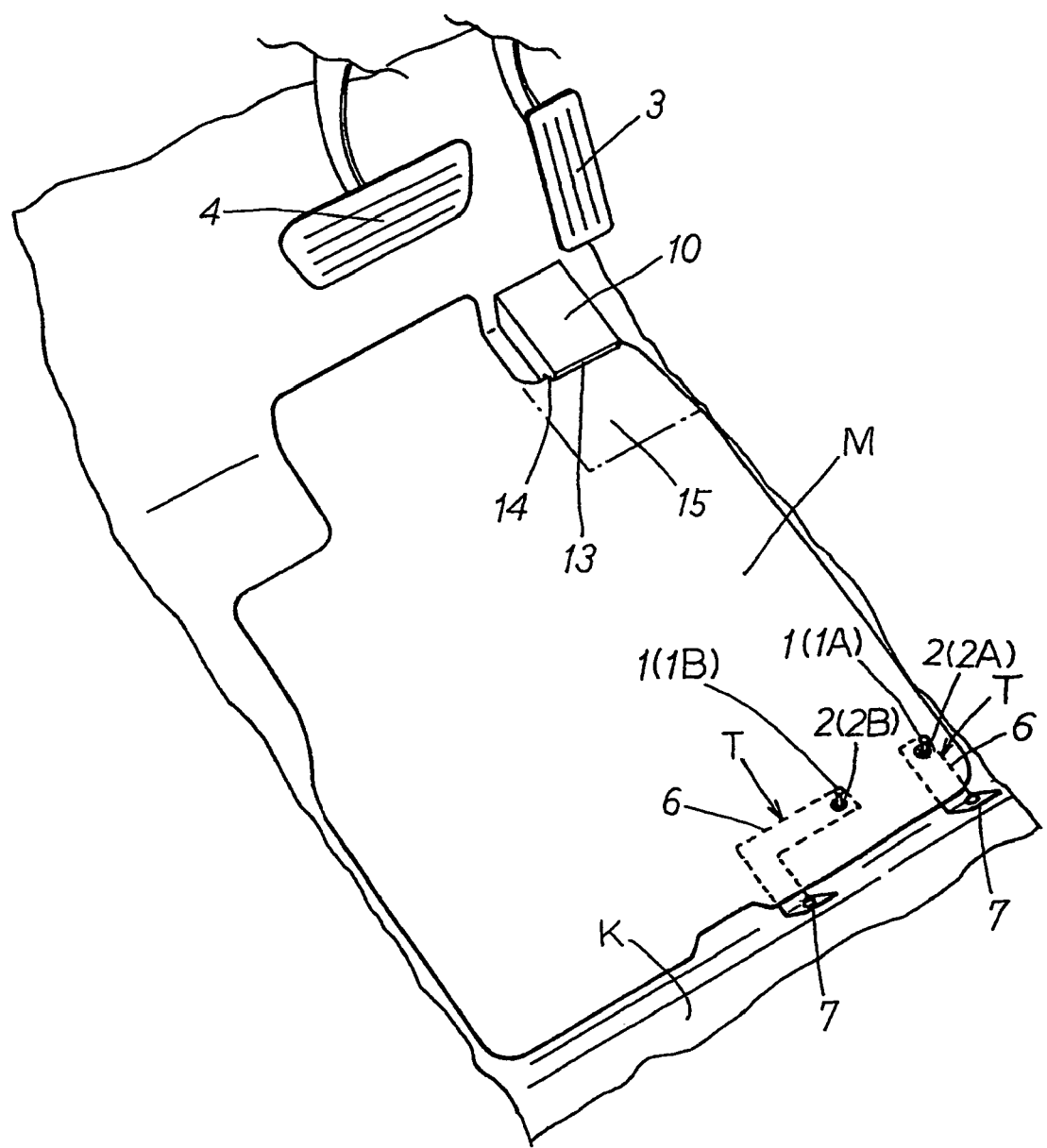
FIG. 23 is an illustrative perspective view showing the embodiment of the invention where an insertion space portion is provided in a projecting portion according to the embodiment.
Figure 24:
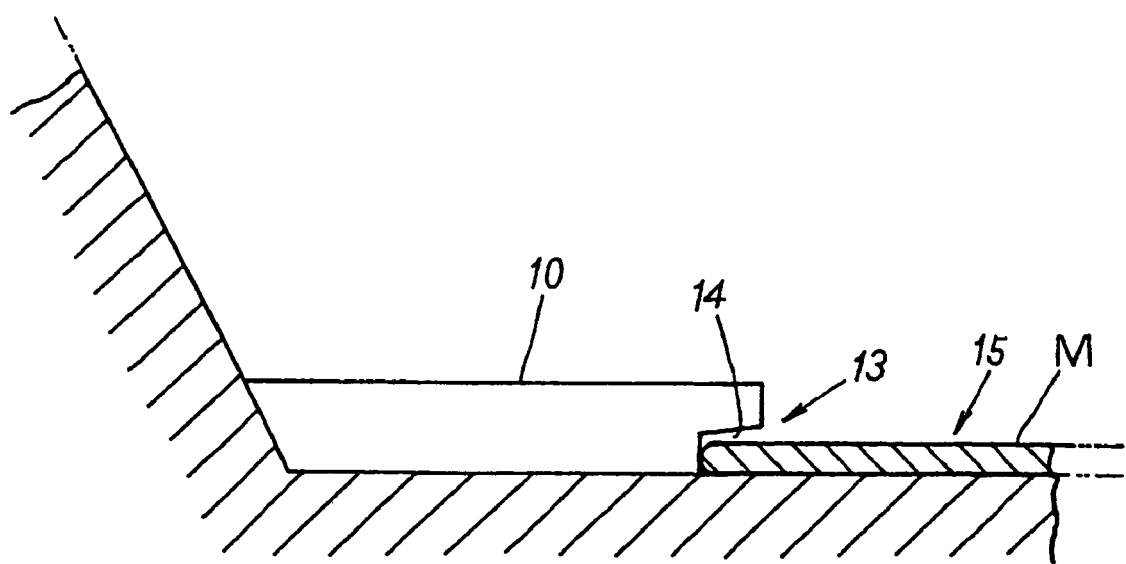
FIG. 24 is an illustrative cross-sectional view showing the embodiment of the invention where an insertion space portion is provided in a projecting portion according to the embodiment.

Also, in an embodiment shown in FIGS. 23 and 24, an insertion recess portion 14 into which a front edge portion of the mat M is to be inserted is formed at the rear edge portion of the projecting portion 10 below the accelerator pedal 3. When the mat M is laid so that the front edge portion of the mat M is inserted into the insertion recess portion 14, the stepped portion 13 may be ensured between the rear edge portion of the above-described projecting portion 10 and the top surface of the mat M.

Namely, a bottom portion of the rear edge portion of the projection portion 10 is formed as the insertion recess portion 14 into which the mat M is to be inserted and is recessed along the floor surface on the front side.

Figure 25:
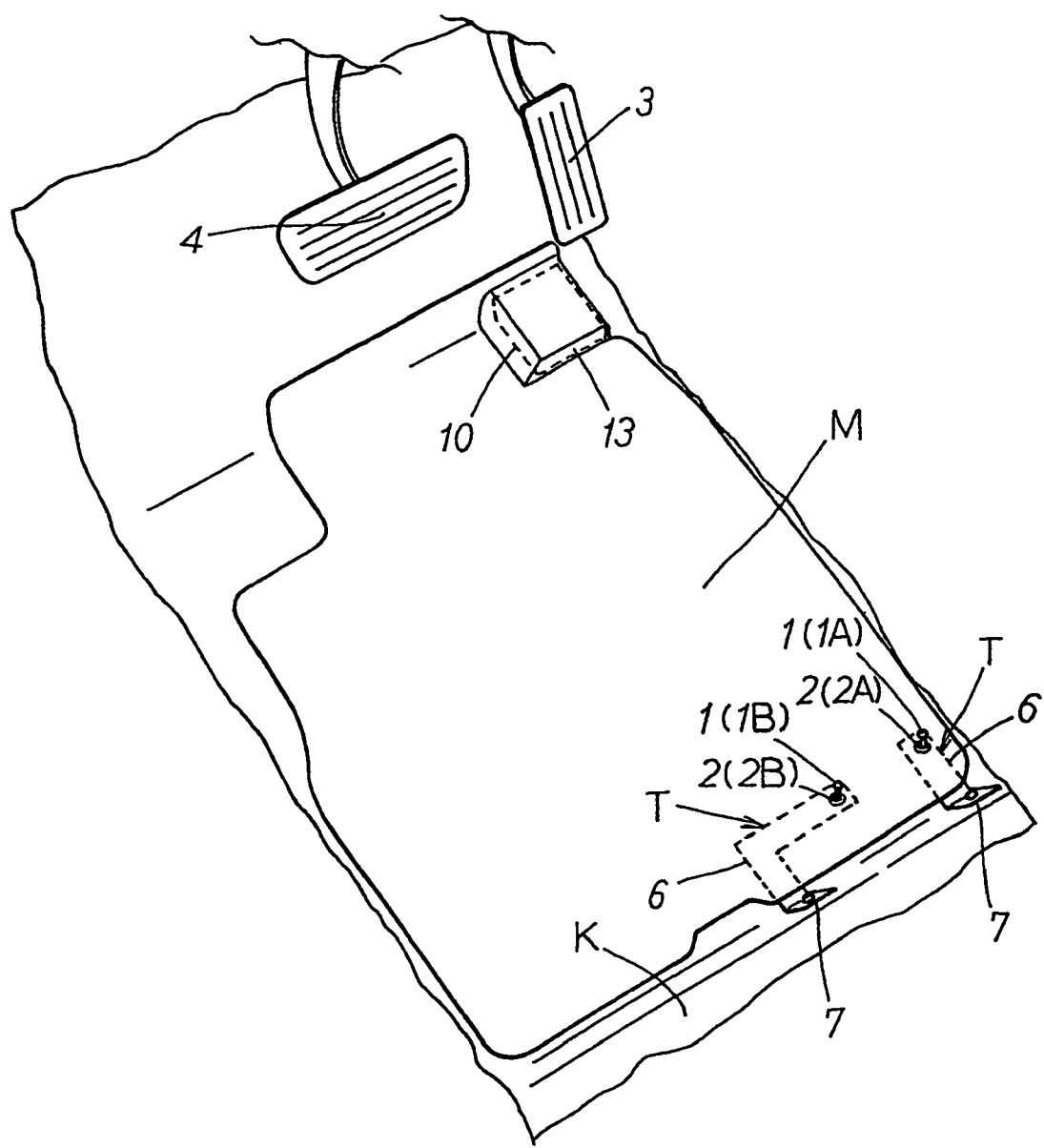
FIG. 25 is an illustrative perspective view showing the embodiment of the invention in which the mat is formed in a fitting shape in engagement with a projecting portion of the embodiment.
Figure 26:
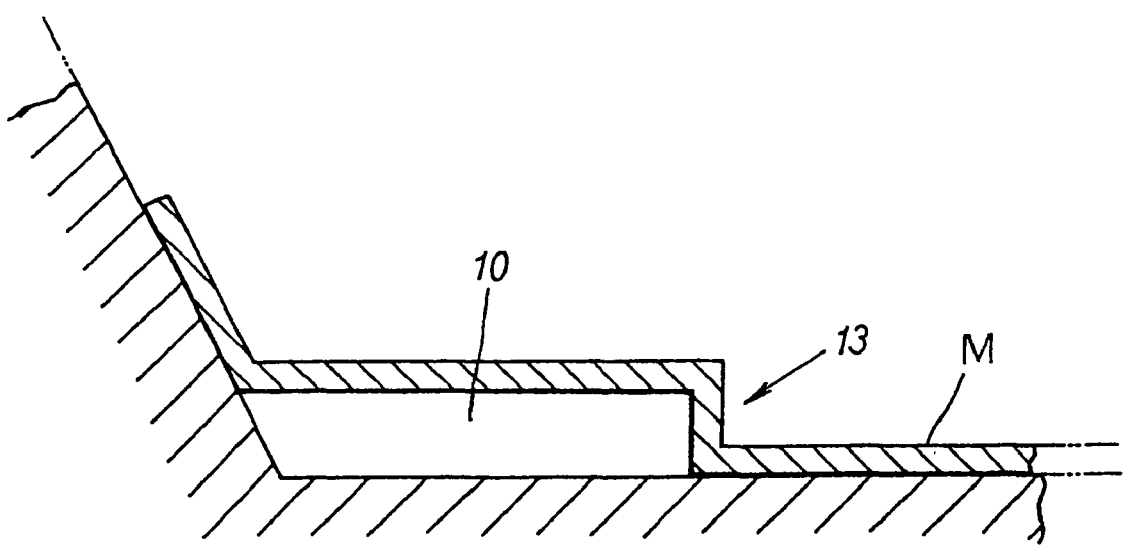
FIG. 26 is an illustrative cross-sectional view showing the embodiment of the invention in which the mat is formed in a fitting shape in engagement with a projecting portion of the embodiment.
Figure 27:
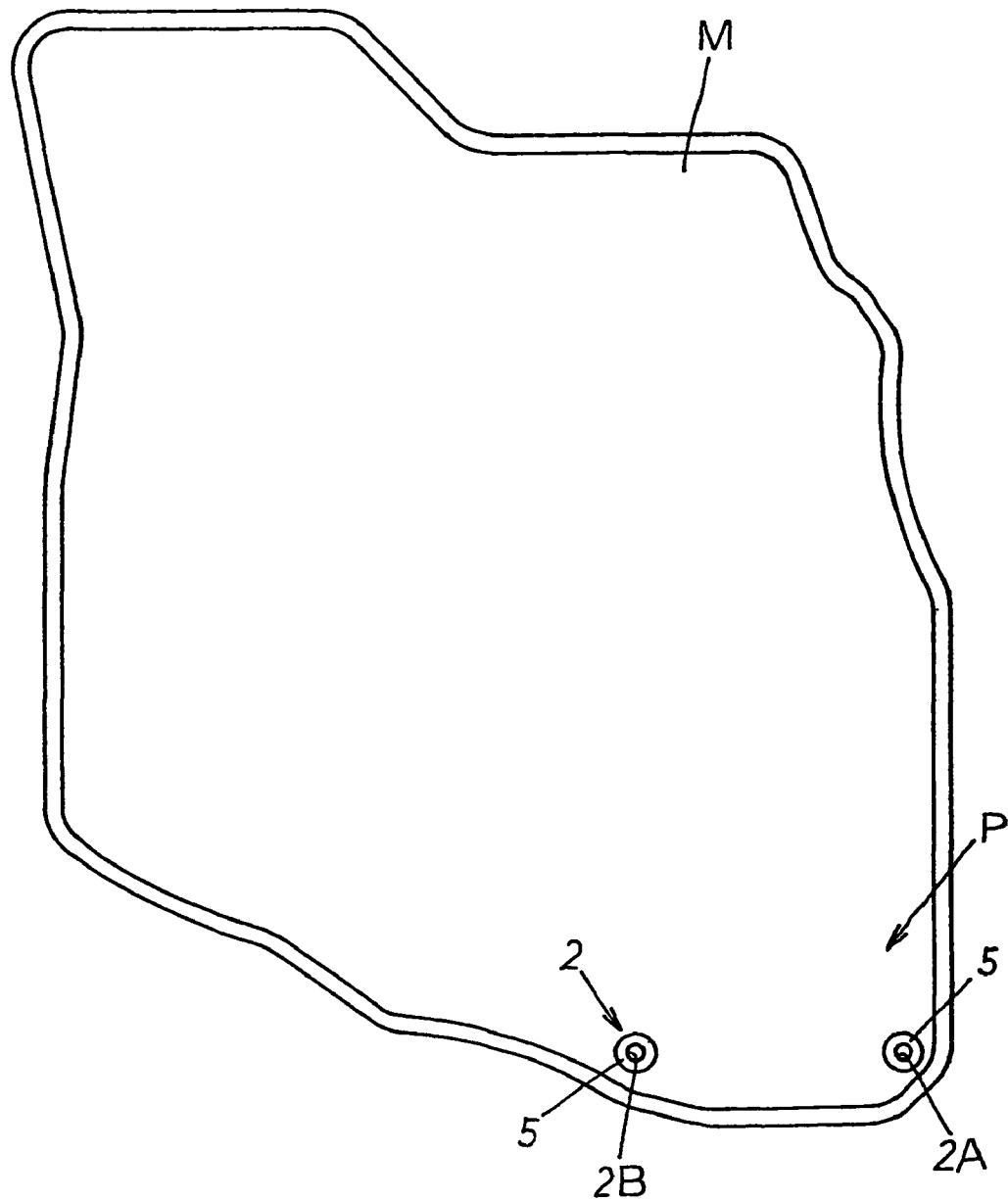
FIG. 27 is a plan view of an automotive vehicle floor mat in accordance with an embodiment of the invention.
Figure 28:
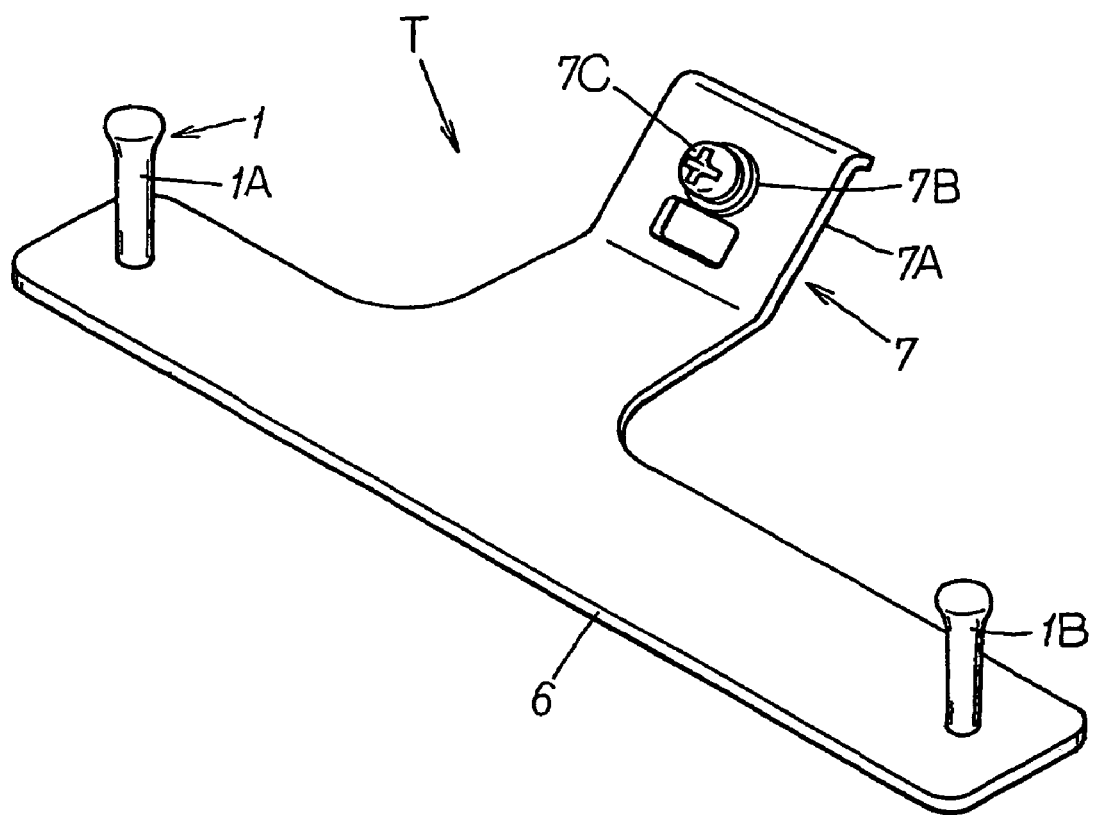
FIG. 28 is a perspective view of an automotive vehicle floor mat retainer member in accordance with an embodiment of the invention.

Also, in an embodiment shown in FIGS. 25 and 26, the projecting portion 10 below the accelerator pedal 3 is covered by means of a front right corner portion of the mat M. The front right portion of the above-described mat M is formed to have a fitting shape in conformity with the above-described projecting portion 10 so that the mat M may engage with the projecting portion 10.

For example, a box is embedded in the floor carpet forming the floor surface to form the projecting portion 10 and this projecting portion 10 is covered by the main mat M. The portion, corresponding to this projecting portion 10, of the mat M is formed into the fitting shape so as to be positioned in place without the mat M being simply slanted between the projecting portion 10 and the floor surface.

More specifically, for either rubber mat or carpet-like mat, a base portion of a bottom portion of the mat M is made of synthetic resin. Upon molding the synthetic resin, a bottom surface recess fitting portion in conformity (engagement) with the projecting portion 10 is formed.

Also, an embodiment shown in FIGS. 27 to 32 will now be described.

An automotive vehicle floor mat M according to this embodiment is made of, for example, cloth (woven cloth) or rubber (resin) solely or in combination thereof For one having a carpet-like surface or a synthetic resin rubber (rubber) surface, retainer holes 2 for retaining retainer pins 1 implanted on the side of the vehicle floor are provided at two positions at a predetermined interval in the vicinity of a rear edge portion of the mat M. (As shown in the drawings, the retainer holes are located at the positions that could not be seen from above by the seat S that is moved back and forth along seat rails R.) The above-described two position retainer holes 2 (two position retainer pins 1 under the fixed condition) are provided on the side portion on the vehicle door side of the floor projecting portion 20 (on the right side to the floor projecting portion 20 in this embodiment) and in the vicinity of the door side rear edge portion P of the mat M having the shape whose rear portion on the vehicle center side is cut away in order to avoid the floor projecting portion 20 of the vehicle center side lower portion of the driver's seat S from the mat M side edge on the vehicle center side to the vicinity of the center of the mat M and whose rear portion of the vehicle door is projected most rearward Also, in this embodiment, a first retainer hole 2A (first retainer pin 1A) of the above-described two position retainer holes 2 is provided on the side edge portion of on the vehicle door side of the mat M and on the vehicle door side to the position of the seat rail R (front extension position), on the vehicle door side, for moving the driver's seat S back and forth, whereas a second retainer hole 2B (second retainer pin 1B) is provided on the center side of the vehicle to the position of the seat rail R.

Also, in this embodiment which an embodiment for the application to the right steering wheel vehicle, as shown in FIG. 29, the left side second retainer hole 2B is located in the vicinity of the door side rear edge portion P of the right and rear side of the mat and in the vicinity of the rear extension position of the accelerator pedal 3, whereas the right side first retainer hole 2A is located in the vicinity of the side edge on the vehicle door side and on the right side separated at a predetermined interval from the above-described second retainer hole 2B.

Also, a fastener or retainer member 5 (doughnut-shape as viewed from above and C-shaped cross-section, for example) having a rigidity and made of metal or non-metal (for example, resin may be used) is provided in an inner edge of each retainer hole 2. This fastener member 5 has a thickness that is smaller than a height of the above-described retainer pin 1.

Namely, since the mat is laid so that the retainer holes 2 are arranged in such positions, the positions of the two position retainer pins 1 of the fastener member T to be inserted into these retainer holes 2 are set up so as to be located in the above-described positions.

Namely, in the fastener member T according to this embodiment, the above-described retainer pins 1 are implanted in the substrate portion 6 to be fixed to the vehicle body at the two positions where the retainer pins 1 are inserted into the retainer holes 2 provided in the above-described predetermined positions of the above-described automotive vehicle floor mat M.

More specifically, the two retainer pins 1 are implanted under the juxtaposed condition in the right and left direction at an interval that is identified with the interval between the two position retainer holes 2 in the single substrate portion 6 that has a length in the right and left direction and that is covered by the rear edge portion of the above-described automotive vehicle floor mat M and provided with a fixture portion 7 for fixture to the vehicle body. The fastener member is composed of the fixture portion 7 for fixture to the above-described vehicle body and the substrate portion 6 which are integrally formed into a T-shape.

Namely, in this embodiment, a T-shaped plate provided with a rearward projecting portion at the central portion of a laterally extending plate in which the two retainer pins 1 are implanted at a predetermined interval is formed. The projecting portion is used as the fixture portion 7. Thus, the T-shaped member is formed to thereby extremely enhance the mechanical strength in comparison with the L-shaped member.

More specifically, the laterally extending substrate portion 6 is provided in front of the fixture portion 7 to be fixed to the vehicle body to form the T-shape. A front end mounting metal portion 21 of the seat rail R on the side of the door of the above-described vehicle to thereby fix this fixture portion 7 to the vehicle.

Namely, in this embodiment, the rear end portion is raised and slanted so that the rear projecting portion of the T-shaped plate is coupled with a front end of the mounting member 21 of the front end portion of the seat rail R. A screw hole 7B aligned with the screw fastening hole formed in the mounting member 21 of the seat rail R is formed in the rear end portion 7A, raised and slanted, of the rearward projecting portion. The fastening with a screw 7C through this screw hole 7B is effected to perform the coupling and fixing. This is covered by means of a cover 22.

Accordingly, in this embodiment, the fastener member 5 formed into a T-shape member is mounted by utilizing the seat rail R. The retainer pins 1 are implanted and arranged with respect to a border of the forward extension position of this seat rail R. It is therefore possible to readily firmly implant the two retainer pins 1 at the positions identified with the two retainer holes 2 of the mat M set at the above-described suitable positions.

Incidentally, this fixture portion 7 may be brought into contact with a front rising surface of a cross member K of the vehicle body. A grommet may be fitted in the screw hole formed in the cross member and a screw may be screwed and fixed through the screw mounting hole and through the grommet. The mounting structure of the fixture portion 7 on the vehicle side may be changed suitably as desired.

Also, instead of the single fastener member T as in the foregoing embodiment (without using the integral structure where the two retainer pins are implanted), it is possible to provide two substrate portions 6 provided with the fixture portions 7 to be fixed to the above-described vehicle body and each of which is provided with the single pin 1 and to arrange each substrate portion 6 in the position where the above-described two retainer pins 1 are inserted into the retainer holes 2 of the above-described automotive vehicle floor mat M under the condition that each substrate portion 6 is fixed to the vehicle body by each fixture portion 7. In this case, the pair of two fastener units T are used to increase the number of the components but it is possible to reduce the weight and to miniaturize the size thereof Also, it is possible to take a structure in which a head portion of the retainer pin 1 is formed to expand widely at least back and forth from a shaft portion so that the head portion is hardly pulled apart from the retainer hole 2 of the mat M.

Also, a mushroom-shaped cap made of hard rubber (resin) may be fitted around a tip end of the retained pin 1 to form a head portion of the above-described retainer pin 1. In this case, even if this portion is brought into contact with the shoes, the shoe is not damaged.

INDUSTRIAL APPLICABILITY

Since the present invention has been made as described above, it is possible to provide a quite novel automotive vehicle floor mat, in which retainer pins and retainer holes are provided at two positions to make it possible to positively perform the positioning upon laying the mat, and in addition, the positions and the arrangement interval of these retainer pins and the retainer holes are suitably selected to thereby dispense with using a structure for adjusting the interval between the retainer pins, also to cope with change of the hole positions due to the aging change, to make it possible to use the mat for a long period of time without a fear that the retainer pins could not be fitted into the retainer holes, to narrow the interval not too much to thereby make it possible to perform the positive positioning upon laying the mat, i.e., to make it possible to lay and set the mat even if the mat is used for a long period of time due to the rattling displacement of the retainer pins and the retainer holes, to make it possible to cause the positional displacement upon laying and setting the mat to fall within a range where no substantially problem is raised in both in the back-and-forth direction and the right and left rotational direction, and furthermore to keep the driver's shoe of the left foot to hardly come into contact with the retainer pins to thereby bring about almost no fear that the shoe is damaged.

Also, according to the second aspect of the invention, there is provided an optimum automotive floor mat that may exhibits further positively the above-described advantages and effects.

Also, according to the third aspect of the invention, there is provided an optimum automotive floor mat that may exhibits further positively the above-described advantages and effects. Particularly for the right steering wheel vehicle, since the two retainer pins are close to the door side, it is easy to lay and set the mat.

Also, according to the fourth and fifth aspects of the invention, it is possible to provide an automotive vehicle floor mat retainer unit, in which retainer pins and retainer holes are provided at two positions to make it possible to positively perform the positioning upon laying the mat, and in addition, the positions and the arrangement interval of these retainer pins and the retainer holes are suitably selected to thereby dispense with using a structure for adjusting the interval between the retainer pins, also to cope with change of the hole positions due to the aging change, to make it possible to use the mat for a long period of time without a fear that the retainer pins could not be fitted into the retainer holes, to narrow the interval not too much to thereby make it possible to perform the positive positioning upon laying the mat, i.e., to make it possible to lay and set the mat even if the mat is used for a long period of time due to the rattling displacement of the retainer pins and the retainer holes, to make it possible to cause the positional displacement upon laying and setting the mat to fall within a range where no substantially problem is raised in both in the back-and-forth direction and the right and left rotational direction, and furthermore to keep the driver's shoe of the left foot to hardly come into contact with the retainer pins to thereby bring about almost no fear that the shoe is damaged.

Also, according to the sixth and seventh aspects of the invention, it is possible to provide an automotive vehicle floor mat fastener that is extremely superior in practical use with the small number of mechanical parts and is easy to mount.

Also, according to the eighth aspect of the invention, it is possible to miniaturize and reduce in weight the substrate portion on which the retainer pins are to be provided.

Also, according to the ninth aspect of the invention, it is possible to reduce the height of the retainer pins since the disengagement is hard, and it is possible to provide a novel automotive floor mat fastener correspondingly, which is easy to be laid.

Also, according to the tenth aspect of the invention, the mounting is easy and there is no damage to the shoe even if the number of the retainer pins is increased.

Also, according to the eleventh aspect of the invention, it is possible to further reduce the number of the mechanical parts.

Also, according to the fifteenth and sixteenth aspects of the invention, it is possible to provide an automotive vehicle floor mat, in which retainer pins and retainer holes are provided at two positions to make it possible to positively perform the positioning upon laying the mat, and in addition, the positions and the arrangement interval of these retainer pins and the retainer holes are suitably selected to thereby dispense with using a structure for adjusting the interval between the retainer pins, also to cope with change of the hole positions due to the aging change, to make it possible to use the mat for a long period of time without a fear that the retainer pins could not be fitted into the retainer holes, to narrow the interval not too much to thereby make it possible to perform the positive positioning upon laying the mat, i.e., to make it possible to lay and set the mat even if the mat is used for a long period of time due to the rattling displacement of the retainer pins and the retainer holes, to make it possible to cause the positional displacement upon laying and setting the mat to fall within a range where no substantially problem is raised in both in the back-and-forth direction and the right and left rotational direction, and furthermore to keep the driver's shoe of the left foot to hardly come into contact with the retainer pins to thereby bring about almost no fear that the shoe is damaged.

Also, according to the seventeenth and eighteenth aspects of the invention, it is possible to provide an automotive vehicle floor mat retainer unit, in which retainer pins and retainer holes are provided at two positions to make it possible to positively perform the positioning upon laying the mat, and in addition, the positions and the arrangement interval of these retainer pins and the retainer holes are suitably selected to thereby dispense with using a structure for adjusting the interval between the retainer pins, also to cope with change of the hole positions due to the aging change, to make it possible to use the mat for a long period of time without a fear that the retainer pins could not be fitted into the retainer holes, to narrow the interval not too much to thereby make it possible to perform the positive positioning upon laying the mat, i.e., to make it possible to lay and set the mat even if the mat is used for a long period of time due to the rattling displacement of the retainer pins and the retainer holes, to make it possible to cause the positional displacement upon laying and setting the mat to fall within a range where no substantially problem is raised in both in the back-and-forth direction and the right and left rotational direction, and furthermore to keep the driver's shoe of the left foot to hardly come into contact with the retainer pins to thereby bring about almost no fear that the shoe is damaged.

Also, according to the nineteenth aspect of the invention, it is possible to miniaturize and reduce in weight the substrate portion on which the retainer pins are to be provided.

Also, according to the twentieth aspect of the invention, in the retainer unit on the central side in which the mounting position is limited, the above-described L-shaped type one is adopted whereby even if the mounting position is limited, it is possible to provide an automotive vehicle floor mat fastener unit in which the two retainer pins may be implanted and arranged in the suitable positions.

Also, in accordance with the twenty-first and twenty-second aspects of the invention, in some cases, a projecting portion is provided below the accelerator pedal, the floor mat is laid, and at the same time, a right corner front edge portion of the floor mat is brought into contact or abutment with a stepped portion between a rear end portion of this projecting portion and the floor surface so that the mat may correctly and easily be positioned in place. In order to further enhance the positioning effect of the mat, it is possible to provide an automotive vehicle floor mat.

Also, in particular, in accordance with the twenty-second aspect of the invention, it is possible to provide an automotive vehicle floor mat that may easily be realized with an easy method and is superior in practical use.

Also, in accordance with the twenty-third and twenty-fourth aspects of the invention, it is possible to provide an automotive floor mat that may exhibit positively the positioning effect due to the simple structure when the mat is to be laid and is superior in practical use.

Also, according to the twenty-fifth aspect of the invention, it is possible to provide an automotive vehicle floor mat, in which retainer pins and retainer holes are provided at two positions to make it possible to positively perform the positioning upon laying the mat, and in addition, the positions and the arrangement interval of these retainer pins and the retainer holes are suitably selected to thereby dispense with using a structure for adjusting the interval between the retainer pins, also to cope with change of the hole positions due to the aging change, to make it possible to use the mat for a long period of time without a fear that the retainer pins could not be fitted into the retainer holes, to narrow the interval not too much to thereby make it possible to perform the positive positioning upon laying the mat, i.e., to make it possible to lay and set the mat even if the mat is used for a long period of time due to the rattling displacement of the retainer pins and the retainer holes, to make it possible to cause the positional displacement upon laying and setting the mat to fall within a range where no substantially problem is raised in both in the back-and-forth direction and the right and left rotational direction, and furthermore to keep the driver's shoe to hardly come into contact with the retainer pins to thereby bring about almost no fear that the shoe is damaged.

Also, according to the invention, there is provided a superior automotive vehicle floor mat that is easy to lay and set since the two retainer pins are close to the door side.

In particular, also, in the case of the mat having, for example, the shape whose rear portion on the vehicle center side is cut away in order to avoid the floor projecting portion of the vehicle center side lower portion of the driver's seat from the mat side edge on the vehicle center side on the rear portion of the mat to the vicinity of the center of the mat so that the mat may be laid only on the flat floor surface, the retainer holes are provided in the vicinity of the door side rear edge portion of the mat extending in the vehicle rear portion of the mat. Accordingly, the retainer pins are not located on the front side so that there is almost no fear that the right and left shoes would be damaged.

Also, according to the twenty-sixth and twenty-seventh aspects of the invention, there is provided an optimum automotive vehicle floor mat that may exhibits further positively the above-described advantages and effects.

Figure 1A:
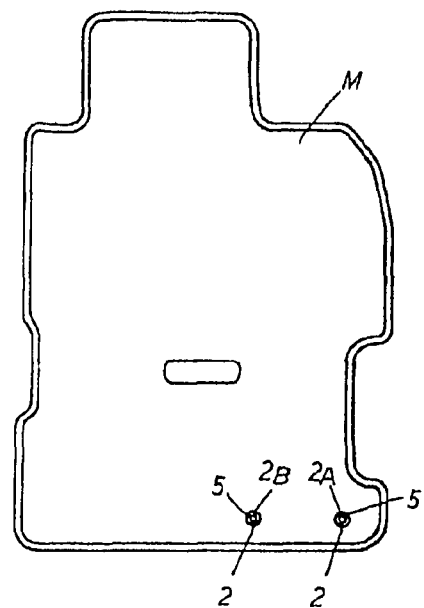
FIGS. 1a and 1b are is plan views showing a mat for a right steering wheel vehicle and a mat for a left steering wheel vehicle of an automotive vehicle floor mat (for driver's seat) in accordance with an embodiment.
Figure 1B:
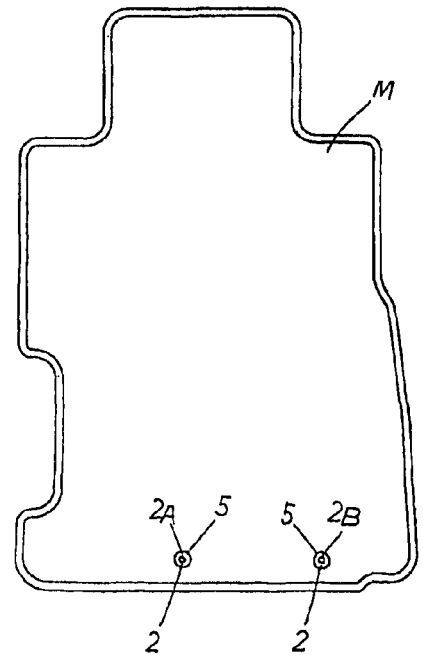
Figure 2:
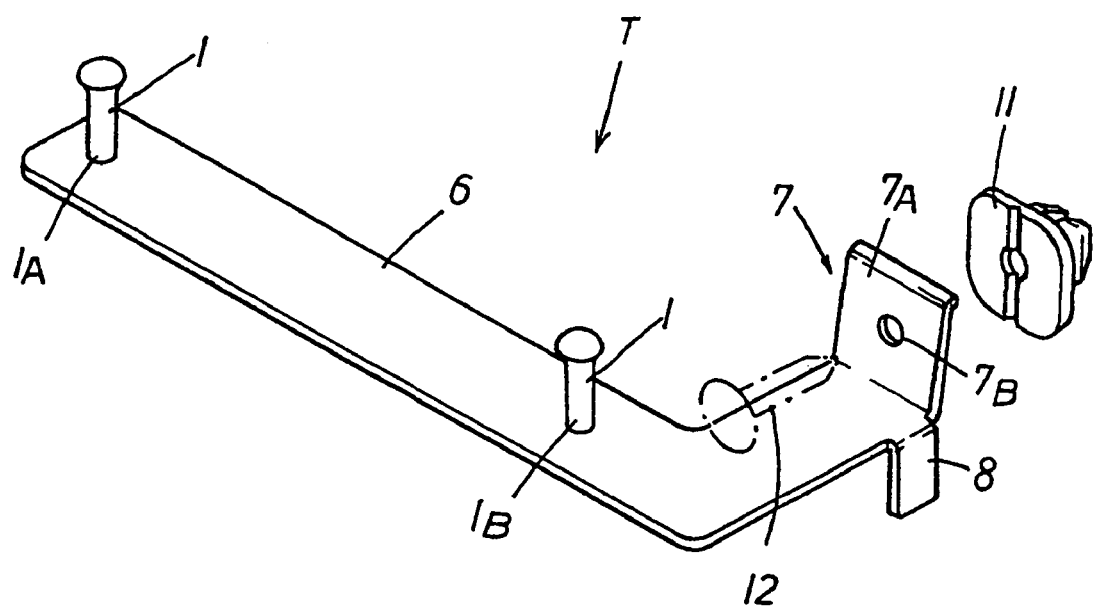
FIG. 2 is a perspective view in accordance with the embodiment.
Figure 14:
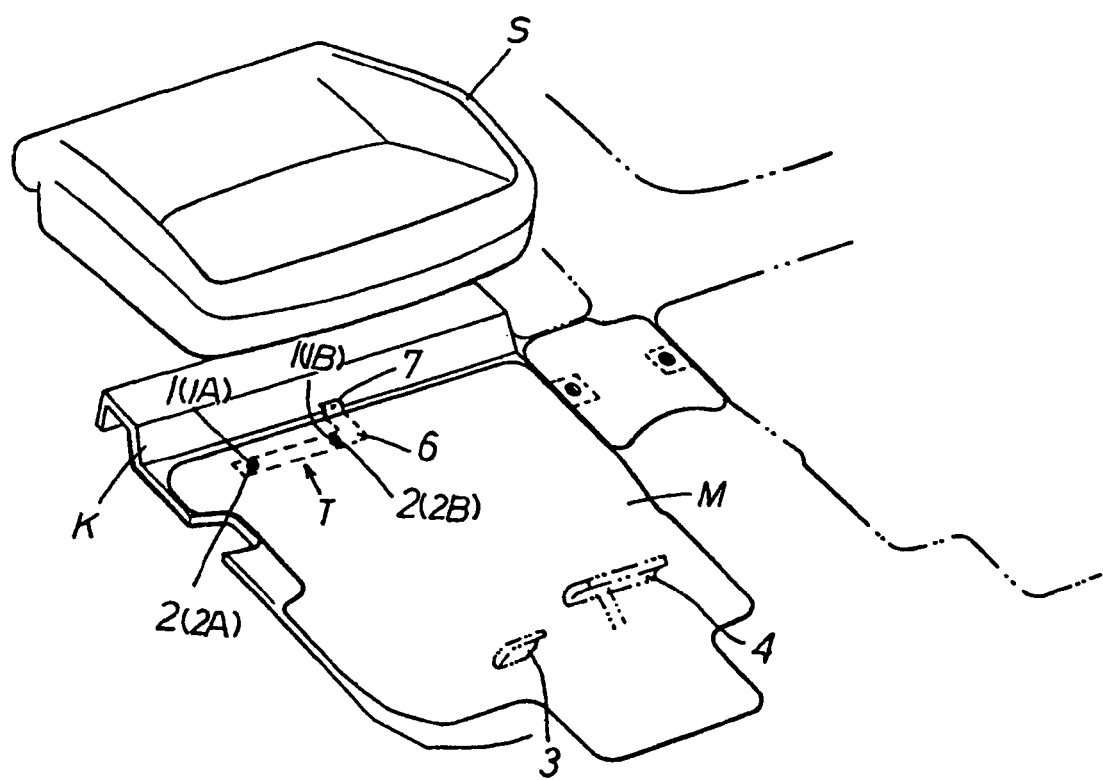
FIG. 14 is an illustrative perspective view showing a case where an intermediate portion and a navigator's seat mat are coupled with a floor mat of the driver's seat according to the embodiment.

Also, in accordance with the twenty-ninth aspect of the invention, for example, as shown in the lower part of FIGS. 1a, 1b and FIG. 14, the rear edge of the mat M between these two position retainer holes 2 is formed into a cutaway portion upward or a straight edge where no recess edge portion is present. Even if the cutaway portion or the recess edge portion is formed in the rear edge of the mat, the retainer holes are not arranged on the right and left sides with respect to this border and the two retainer holes are arranged on the same side to the cutaway portion or the recess portion. Accordingly, the hole position is hardly changed due to the use. It is therefore possible to provide an excellent automotive vehicle mat.

Also, according to the thirtieth and thirty-first aspects of the invention, it is possible to provide an automotive vehicle floor mat retainer unit, in which retainer pins and retainer holes are provided at two positions to make it possible to positively perform the positioning upon laying the mat, and in addition, the positions and the arrangement interval of these retainer pins and the retainer holes are suitably selected to thereby dispense with using a structure for adjusting the interval between the retainer pins, also to cope with change of the hole positions due to the aging change, to make it possible to use the mat for a long period of time without a fear that the retainer pins could not be fitted into the retainer holes, to narrow the interval not too much to thereby make it possible to perform the positive positioning upon laying the mat, i.e., to make it possible to lay and set the mat even if the mat is used for a long period of time due to the rattling displacement of the retainer pins and the retainer holes, to make it possible to cause the positional displacement upon laying and setting the mat to fall within a range where no substantially problem is raised in both in the back-and-forth direction and the right and left rotational direction, furthermore to keep the driver's shoe to hardly come into contact with the retainer pins to thereby bring about almost no fear that the shoe is damaged, and to make the hole position to be hardly changed due to the use.

Also particularly, it is possible to provide an automotive vehicle floor mat retainer unit in which there is almost no fear that the retainer pin damages the shoe as described above.

Also, according to the thirty-second and thirty-third aspects of the invention, it is possible to provide an automotive vehicle floor mat retainer unit that is extremely superior in practical use, small in number of the mechanical part, enhanced in mounting strength and easy to mount and fix.

In particular, in the thirty-third aspect of the invention, a T-shaped member is mounted by utilizing the seat rail, and the retainer pins are implanted and arranged on the right and left sides with respect to the border of the seat rail. It is possible to provide an extremely novel automotive vehicle floor mat fastener tool in which the two retainer pins may readily and firmly be implanted at the positions identified with the two retainer holes of the mat set in the suitable positions.

Also, according to the thirty-fourth aspect of the invention, it is possible to miniaturize and reduce in weight the substrate portion on which the retainer pins are to be provided.

The invention claimed is:

1. An automotive vehicle floor mat system, comprising:
   a floor foot space of a driver's seat of an automobile, the automobile having a accelerator pedal and a brake pedal, and the floor having retainer pins located thereon;

a floor mat adapted to be located in front of a driver's seat and on the floor beneath the accelerator pedal and the brake pedal, said floor mat having a front and a rear edge wherein said edges are defined when said floor mat is on the floor space as said front edge being closest to the accelerator pedal and the brake pedal, and said rear edge being the edge farthest from the accelerator pedal and the brake pedal;

said floor mat comprising only first and second retainer holes and no additional retainer holes;

said first and second retainer holes provided at two positions at a predetermined interval in and within about two inches of the rear edge of said mat, said retainer holes being adapted to engage said retainer pins, retainer members having a rigidity and made of metal or non-metal provided on an inner edge of each retainer hole, and wherein a thickness of said retainer members is smaller than a height of said retainer pins, wherein the first retainer hole is provided on a right rear side of the mat and within about two inches of a rear extension portion of an accelerator pedal with a center of said first retainer hole being positioned on the right side of a left edge extension line of the accelerator pedal or a right edge extension line of the accelerator pedal, and, a second retainer hole is provided closer to a center side of the mat than said first retainer hole and within about two inches of a rear extension portion of a brake pedal with a center of said second retainer hole being positioned on the right side of a left extension line of the brake pedal or a center extension line of the brake pedal.

2. The automotive vehicle floor mat system according to claim 1, further characterized in that a center interval between said two position retainer holes is in the range of 100 mm to 250 mm.

3. The automotive vehicle floor mat system according to either claim 1 or 2, wherein:

a center of said first retainer hole is positioned on the right side of a right edge extension line of the accelerator pedal, and a center of said second retainer hole is positioned on the right side of a left extension line of the brake pedal.

4. An automotive vehicle floor mat retainer unit for retaining the automotive vehicle floor mat system according to any one of claims 1 to 2, characterized in that said retainer pins are implanted at positions where said retainer pins are inserted into the two position retainer holes provided at said predetermined positions of said automotive vehicle floor mat, in a substrate portion for fixture to a vehicle body.

5. An automotive vehicle floor mat retainer unit for an automotive floor mat adapted to be located on the floor in front of a driver's seat and beneath an accelerator pedal and a brake pedal, said floor mat having a front and a rear edge wherein said edges are defined when said floor mat is on the floor space as said front edge being closest to the accelerator pedal and the brake pedal, and said rear edge being the edge farthest from the accelerator pedal and the brake pedal, said floor mat comprising only first and second retainer holes and no additional retainer holes; and said floor mat retainer unit characterized in that first and second retainer pins are implanted in a substrate under the floor mat, said retainer pins being engagable with said two position retainer holes provided at predetermined positions of the floor mat, the first retainer pin being provided within about two inches of a rear extension portion of the accelerator pedal and on a right rear side of the mat with the first retainer pin being positioned on the right side of a left edge extension line of the accelerator pedal or a right edge extension line of the accelerator pedal, and the second retainer pin provided closer to a center side of the mat than said first retainer pin and within about two inches of a rear extension portion of a brake pedal with the second retainer pin being positioned on the right side of a left extension line of the brake pedal or a center extension line of the brake pedal.

6. The automotive vehicle floor mat retainer unit according to claim 5, further characterized in that the two retainer pins are in a juxtaposed condition in a right and left direction at an interval that is the same as the interval between said two position retainer holes, in a single substrate portion covered by a portion of said automotive vehicle floor mat, said substrate portion being provided with a fixture portion for fixture to the vehicle body.

7. The automotive vehicle floor mat retainer unit according to claim 6, comprising the fixture portion for fixture to the vehicle body and the substrate portion in which said two retainer pins are implanted and further comprising a rotation preventing portion retained to the vehicle body for preventing said substrate portion from rotating, wherein a single metal plate is bent and formed to establish an L-shaped relation among the respective portions with each other.

8. The automotive vehicle floor mat retainer unit according to claim 5 comprising the fixture portion for fixture to the vehicle body and two substrate portions each of which has the single retainer pin implanted, under the condition that each substrate plate portion is fixed to the vehicle body by each fixture portion, the two retainer pins are arranged at the positions where the pins are inserted into the retainer holes of said automotive vehicle floor mat.

9. The automotive vehicle floor mat retainer unit according to claim 8, characterized in that a head portion of said retainer pin is expanded and formed to have at least a greater width in a forward and backward direction than a shaft portion and slanted and raised upwardly on the rear side.

10. The automotive vehicle floor mat retainer unit according to claim 9, characterized in that a cap made of hard rubber is fitted at a tip end of the retainer pin to form a head portion of said retainer pin.

11. The automotive vehicle floor mat retainer unit according to claim 10, characterized in that said retainer pin is cut, raised and formed from said substrate portion.

12. An automotive vehicle floor mat adapted to be located on the floor in front of a driver's seat and on the floor beneath the accelerator pedal and a brake pedal, said floor mat having a front and a rear edge wherein said edges are defined when said floor mat is on the floor space as said front edge being closest to the accelerator pedal and the brake pedal, and said rear edae being the edge farthest from the accelerator pedal and the brake pedal, said floor mat comprising only first and second retainer holes and no additional retainer holes; and characterized in that said first and second retainer holes to be retained at retainer pins implanted on a vehicle floor side, respectively, are provided at two positions at a predetermined interval within about two inches of a rear edge of said mat, the first retainer hole is provided on a right rear side of the mat and within about two inches of a rear extension portion of a floor projecting portion below an accelerator pedal with a center of said first retainer hole being positioned on the right side of a left edge extension line of the accelerator pedal or a right edge extension line of the accelerator pedal, the second retainer hole is provided closer to a center side of the mat than said first retainer hole and within about two inches of a rear extension portion of a brake pedal with a center of said second retainer hole being positioned on the right side of a left extension line of the brake pedal or a center extension line of the bake pedal, a retainer member having a rigidity and made of metal or non-metal is provided on an inner edge of each retainer hole, a center interval between said first and second retainer holes is in the range of 100 mm to 200 mm, each of said retainer holes and said retainer pins for engaging each of said retainer holes are set at positions under a driver's seat behind the mat, and a thickness of said retainer member is set to be smaller than a height of said retainer pins.

13. An automotive vehicle floor mat retainer unit for retaining the automotive vehicle floor mat according to claim 12, characterized in that said retainer pins are implanted at positions where said retainer pins are inserted into the two position retainer holes provided at said predetermined positions of said automotive vehicle floor mat, in a substrate portion for fixture to a vehicle body.

14. An automotive vehicle floor mat retainer unit according to claim 13 further characterized in that first and second retainer pins are implanted in positions where said retainer pins are inserted into two position retainer holes provided at predetermined positions of an automotive vehicle floor mat, in a substrate portion for fixture to a vehicle body, and under the condition of fixture to the vehicle body, the first retainer pin is provided under a rear extension portion of a floor projecting portion below an accelerator pedal and on a right rear side of the mat, the second retainer pin is provided under a rear extension portion of a brake pedal and a center interval between said first and second retainer pins is in the range of 100 mm to 200 mm.

15. The automotive vehicle floor mat retainer unit according to claim 14, further characterized by comprising the fixture portion for fixture to the vehicle body and two substrate portions each of which has the single retainer pin implanted, and in that under the condition that each substrate plate portion is fixed to the vehicle body by each fixture portion, the two retainer pins are arranged at the positions where the pins are inserted into the retainer holes of said automotive vehicle floor mat.

16. The automotive vehicle floor mat retainer unit according to claim 15, further characterized by comprising the fixture portion for fixture to the vehicle body and two substrate portions each of which has the single retainer pins implanted, one of said substrate portions located on the right side has a length in a forward and backward direction and is of a straight type in which said fixture portion is provided at a rear end portion thereof, the other substrate portion located on the left side has a long side portion having a length in a right and left direction as an L-shape and is of an L-shaped type in which said fixture portion is provided at a rear end portion of a short side portion in the back-and-forth direction, and each of said substrate portions is disposed so that the two retainer pins are arranged in positions where the retainer pins are inserted into the retainer holes of said automotive vehicle floor mat under the condition each of said substrate portion is fixed to a vehicle body by each of said fixture portions.

17. An automotive vehicle floor mat to be laid in a foot space of a driver's seat according to any one of claims 1, 2, and 12, further characterized in that a heel step portion at a front right corner with which a heel of right foot stepping an accelerator pedal is brought into contact, of the mat that is to be laid so as to be close to and in abutment with a stepped portion between a rear end portion of a projecting portion below an accelerator pedal and a floor surface is cured so that said stepped portion is ensured to have a thickness for positioning the mat under the condition that the mat is laid.

18. An automotive vehicle floor mat to be laid in a foot space of a driver's seat according to any one of claims 1, 2, and 12, further characterized in that a pad member is bonded to a heel step portion at a front right corner with which a heel of right foot stepping an accelerator pedal is brought into contact, of the mat that is to be laid so as to be close to and in abutment with a stepped portion between a rear end portion of a projecting portion below an accelerator pedal and a floor surface so that said stepped portion is ensured to have a thickness for positioning the mat under the condition that the mat is laid.

19. An automotive vehicle floor mat to be laid in a foot space of a driver's seat according to any one of claims 1, 2, and 12, further characterized in that an insertion space portion into which a front edge portion of the mat is to be inserted is recessed in a rear end portion of a projecting portion below an accelerator pedal, and a stepped portion is ensured between a top surface of the mat and a rear end portion of said projecting portion when the mat is laid under the condition that the front edge portion of the mat is inserted into said insertion space portion.

20. An automotive vehicle floor mat to be laid in a foot space of a driver's seat according to any one of claims 1, 2, and 12, further characterized in that a projecting portion below an accelerator pedal is covered by a front right corner portion of the mat and the front right corner portion of the mat is molded and formed into a fitting shape in conformity with said projecting portion so that the mat may engage with said projecting portion.

21. An automotive vehicle floor mat to be laid in a foot space of a driver's seat, said mat having a door side and a center side, and characterized in that first and second retainer holes for retaining, respectively, retainer pins implanted on a vehicle floor side are provided at two positions at a predetermined interval on a door side of a mat having a shape in which a rear portion on a center side of a vehicle is cut away and a rear side of a vehicle door side extends most backwardly,
   said floor mat comprising only first and second retainer holes and no additional retainer holes;
   said first and second retainer holes provided at two positions at a predetermined interval in and within about two inches of the rear edge of said mat, said retainer holes being adapted to engage said retainer pins,
   and the first retainer hole on the vehicle door side of the two position retainer holes is located on the vehicle door side to a front extension position of a seat rail, on the vehicle door side, for moving a driver's seat forward and backward and on the end portion of the vehicle door side at a predetermined interval way from the second retainer hole, and
   the second retainer hole on the vehicle center side of the two position retainer holes is located on the vehicle center side to the front extension position of the seat rail and in a rear extension position of a brake pedal;
   wherein the first retainer hole is provided on a right rear side of the mat and within about two inches of a rear extension portion of an accelerator pedal with a center of said first retainer hole being positioned on the right side of a left edge extension line of the accelerator pedal or a right edge extension line of the accelerator pedal or a right edge extension line of the accelerator pedal, and, a second retainer hole is provided closer to a center side of the mat than said first retainer hole and within about two inches of a rear extension portion of a brake pedal with a center of said second retainer hole being positioned on the right side of a left extension line of the brake pedal or a center extension line of the brake pedal.

22. The automotive vehicle floor mat according to claim 21, characterized in that a portion is cut away from an end on the mat on the center side of the vehicle to a central portion of the mat so as to avoid a floor projecting portion of a central lower portion of the vehicle, and the retainer holes for retaining, respectively, retainer pins implanted on a vehicle floor side are provided at two positions at a predetermined interval on the door side of the mat having a shape in which a rear end portion on a vehicle door side is projected most backwardly and on the side on the vehicle door side to the floor projecting portion.

23. An automotive vehicle floor mat to be laid in a foot space of a driver's seat according to any one of claims 21 and 22, characterized in that retainer holes for retaining, respectively, retainer pins implanted on a floor side of a vehicle are provided at two positions at a predetermined interval in the vicinity of a rear edge portion of the mat, and a rear edge of the mat between the two position retainer holes is formed into a straight edge where no recess edge or cutaway directed upwardly is present.

24. An automotive vehicle floor mat retainer unit for retaining the automotive vehicle floor mat according to claim 21, characterized in that said retainer pins are implanted at positions where said retainer pins are inserted into the two position holes provided at said predetermined positions of said automotive vehicle floor mat, in a substrate portion for fixture to a vehicle body.

25. The automotive vehicle floor mat retainer unit according to claim 24, characterized in that the retainer pins are implanted in positions where the retainer pins are inserted into the two position retainer holes provided at predetermined positions of an automotive vehicle floor mat, in a substrate portion for fixture to a vehicle body, and under the condition of fixture to the vehicle body, said two retainer pins are positioned in the vicinity of a rear edge portion on a door side of the mat having a shape in which a rear portion on a center side of a vehicle is cut away and a rear portion on the vehicle door side project most backwardly.

26. The automotive vehicle floor mat retainer unit according to claim 25, further characterized in that the two retainer pins are in a juxtaposed condition in a right and left direction at an interval that is identified with an interval of said two position retainer holes, in a single substrate portion covered by a portion of said automotive vehicle floor mat and provided with a fixture portion for fixing said substrate portion to the vehicle body.

27. The automotive vehicle floor mat retainer unit according to claim 26, characterized in that a laterally extending substrate portion is provided on a front side of a fixture portion for fixture to the vehicle body to form a T-shape and the fixture portion is fixed to said the seat rail to thereby be fixed to the vehicle body.

28. The automotive vehicle floor mat retainer unit according to claim 26, comprising two substrate portions each of which has the single retainer pin implanted, and each substrate portion is fixed to the vehicle body by a fixture portion.

* * * * *

UNITED STATES PATENT AND TRADEMARK OFFICE
CERTIFICATE OF CORRECTION

PATENT NO. : 7,727,612 B2  Page 1 of 1
APPLICATION NO. : 10/363700
DATED : June 1, 2010
INVENTOR(S) : Hirotaka Haraguchi et al.

It is certified that error appears in the above-identified patent and that said Letters Patent is hereby corrected as shown below:

On the cover page, Item (57);

In line 2 of the Abstract, delete "to be"

In line 3 of the Abstract, after "side,", insert --respectively,--

In line 4 of the Abstract, change "near" to "in the vicinity of"

In lines 9 to 10 of the Abstract, delete "rather on a center side of the mat than the first retainer hole,"

In line 10 of the Abstract, after "a", insert --rigid--

In line 11 of the Abstract, delete "having a rigidity"

In line 11 of the Abstract, before "is", insert --and made of metal or non-metal--

In the Specifications: In column 4;

Please delete the three paragraphs bridging lines 34-59

Signed and Sealed this

Ninth Day of November, 2010

David J. Kappos
*Director of the United States Patent and Trademark Office*